United States Patent
Geerlings et al.

(10) Patent No.: US 9,858,806 B2
(45) Date of Patent: Jan. 2, 2018

(54) TRAINABLE TRANSCEIVER AND CAMERA SYSTEMS AND METHODS

(71) Applicant: Gentex Corporation, Zeeland, MI (US)

(72) Inventors: Steven L. Geerlings, Holland, MI (US); Todd R. Witkowski, Zeeland, MI (US); Thomas S. Wright, Holland, MI (US); Marc A. Smeyers, Zeeland, MI (US); Jonathan E. Dorst, Holland, MI (US); Douglas C. Papay, Zeeland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 14/690,177

(22) Filed: Apr. 17, 2015

(65) Prior Publication Data

US 2015/0302735 A1    Oct. 22, 2015

Related U.S. Application Data

(60) Provisional application No. 61/981,527, filed on Apr. 18, 2014.

(51) Int. Cl.
*G08C 17/02* (2006.01)
*H04W 4/02* (2009.01)
*H04N 5/232* (2006.01)

(52) U.S. Cl.
CPC ......... *G08C 17/02* (2013.01); *H04N 5/23229* (2013.01); *H04W 4/02* (2013.01);
(Continued)

(58) Field of Classification Search
CPC .... H04N 7/181; H04N 5/23203; G08C 17/02; G08C 2201/21; G07C 9/00896;
(Continued)

(56) References Cited

U.S. PATENT DOCUMENTS 5,614,891 A    3/1997  Zeinstra et al.
5,831,669 A *  11/1998  Adrain ................... H04N 7/181
                                                     348/143
(Continued)

FOREIGN PATENT DOCUMENTS

DE    1020100 15 104 A1    10/2011
EP         1 461 791 A1     9/2004
(Continued)

OTHER PUBLICATIONS

International Search Report and Written Opinion of the International Searching Authority received in PCT/US2015/026458 dated Nov. 12, 2015, 9 pages.
(Continued)

*Primary Examiner* — An T Nguyen
(74) *Attorney, Agent, or Firm* — Foley & Lardner LLP; Bradley D. Johnson

(57) ABSTRACT

A system for installation in a vehicle and for controlling a remote device including a trainable transceiver, a camera, and a control circuit coupled to the trainable transceiver and the camera. The control circuit is configured to use the camera to identify the remote device by comparing information received via the camera to information stored in memory, and the control circuit is configured to automatically transmit an activation signal formatted to control the remote device in response to identifying the remote device.

16 Claims, 13 Drawing Sheets

(52) U.S. Cl.
CPC ..... *G08C 2201/20* (2013.01); *G08C 2201/21* (2013.01); *H04N 5/23203* (2013.01)

(58) Field of Classification Search
CPC ............ G07C 9/00126; G07C 9/00309; G07C 2009/00507; G07C 2009/00928; B60H 1/00771; B08G 1/166
See application file for complete search history.

(56) References Cited

U.S. PATENT DOCUMENTS

| | | |
|---|---|---|
| 9,264,673 B2 | 2/2016 | Chundrlik et al. |
| 9,412,264 B2 | 8/2016 | Geerlings et al. |
| 9,428,119 B2 | 8/2016 | Yellambalase |
| 2003/0197594 A1 | 10/2003 | Olson et al. |
| 2003/0197595 A1 | 10/2003 | Olson et al. |
| 2003/0216139 A1 | 11/2003 | Olson et al. |
| 2005/0242970 A1 | 11/2005 | Blaker et al. |
| 2005/0270177 A1 | 12/2005 | Mori et al. |
| 2007/0057810 A1* | 3/2007 | Bos ................ G08C 17/02 340/12.22 |
| 2008/0291047 A1 | 11/2008 | Summerford et al. |
| 2009/0121852 A1 | 5/2009 | Breuer et al. |
| 2010/0007516 A1 | 1/2010 | Bos et al. |
| 2010/0171588 A1* | 7/2010 | Chutorash .......... G07C 9/00182 340/5.71 |
| 2011/0084126 A1 | 4/2011 | Fleming et al. |
| 2011/0250845 A1 | 10/2011 | Chutorash et al. |
| 2011/0295469 A1 | 12/2011 | Rafii et al. |
| 2012/0265585 A1 | 10/2012 | Muirbrook et al. |
| 2013/0141578 A1* | 6/2013 | Chundrlik, Jr. ........ H04N 7/181 348/148 |
| 2013/0335561 A1 | 12/2013 | Kourogi et al. |
| 2014/0111315 A1 | 4/2014 | Geerlings et al. |
| 2014/0118111 A1 | 5/2014 | Saladin et al. |
| 2014/0145824 A1 | 5/2014 | Chutorash et al. |
| 2015/0084779 A1 | 3/2015 | Saladin et al. |
| 2015/0302735 A1 | 10/2015 | Geerlings et al. |
| 2015/0302736 A1 | 10/2015 | Geerlings et al. |
| 2015/0302737 A1 | 10/2015 | Geerlings et al. |

FOREIGN PATENT DOCUMENTS

| | | |
|---|---|---|
| WO | WO-2006/083953 A2 | 8/2006 |
| WO | WO-2012/103394 A1 | 8/2012 |

OTHER PUBLICATIONS

International Search Report and Written Opinion of the International Searching Authority in PCT/US2015/015262 dated Jul. 2, 2015, 10 pages.
U.S. Office Action on U.S. Appl. No. 14/690,195 dated Apr. 1, 2016.
U.S. Office Action on U.S. Appl. No. 14/690,230 dated Mar. 24, 2016.
International Preliminary Report on Patentability and Transmittal received in corresponding International Application No. PCT/US2015/026458 dated Oct. 27, 2016, 8 pages.
U.S. Office Action on U.S. Appl. No. 14/690,230 dated Sep. 15, 2016.
U.S. Office Action on U.S. 14/690,195 dated Oct. 19, 2016.
U.S. Notice of Allowance on U.S. Appl. No. 14/690,195 dated Jun. 21, 2017.
U.S. Office Action on U.S. Appl. No. 14/690,230 dated Jun. 27, 2017.
Extended European Search Report in EP 15780521.9 dated Mar. 14, 2017, 8 pages.

\* cited by examiner

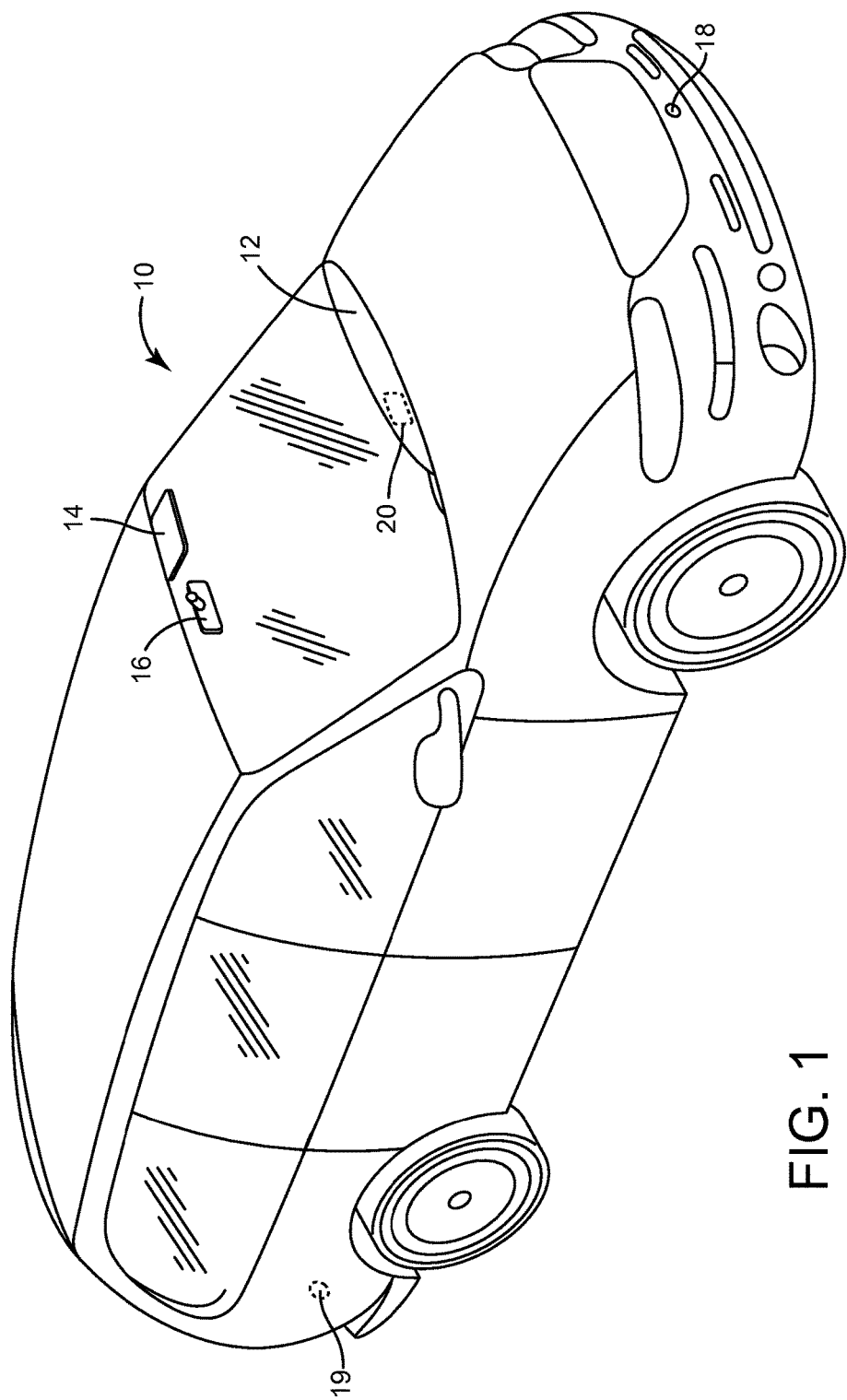

TRAINABLE TRANSCEIVER AND CAMERA SYSTEMS AND METHODS

CROSS REFERENCE TO RELATED APPLICATIONS

This application claims priority to and the benefit of U.S. Provisional Patent Application No. 61/981,527, filed Apr. 18, 2014. The foregoing provisional application is incorporated by reference herein in its entirety.

BACKGROUND

The present invention relates generally to the field of trainable transceivers for inclusion within a vehicle. A trainable transceiver generally sends and/or receives wireless signals using a transmitter, receiver, and/or transceiver. The wireless signals may be used to control other devices. For example, a trainable transceiver may send a wireless control signal to operate a garage door opener. A trainable transceiver may be trained to operate with a particular device. Training may include providing the trainable transceiver with control information for use in generating a control signal. A trainable transceiver may be incorporated in a vehicle (integrally or contained within the vehicle) and used to control devices outside the vehicle. It is challenging and difficult to develop trainable transceivers which are easy to train to operate a variety of devices.

SUMMARY OF THE INVENTION

One embodiment relates to a system for installation in a vehicle and for controlling a remote device including a trainable transceiver, a camera, and a control circuit coupled to the trainable transceiver and the camera. The control circuit is configured to use the camera to identify the remote device by comparing information received via the camera to information stored in memory, and the control circuit is configured to automatically transmit an activation signal formatted to control the remote device in response to identifying the remote device.

Another embodiment relates to a system for installation in a vehicle and for controlling a remote device including a trainable transceiver, a camera interface configured to receive images through a wired or wireless connection with one or more cameras located in or on the vehicle, and a control circuit coupled to the trainable transceiver and the camera interface. The control circuit is configured to use the camera interface to identify the remote device by comparing information received via the camera interface to information stored in memory, and the control circuit is configured to automatically transmit an activation signal formatted to control the remote device in response to identifying the remote.

Another embodiment relates to a system for installation in a vehicle and for controlling a remote device including a camera, a trainable transceiver, and a control circuit coupled to the camera and the trainable transceiver. The control circuit is configured to use information received at the camera to determine which of at least two possible command signals to transmit from the trainable transceiver.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION

FIG. 1 is illustrates a vehicle including a camera and a plurality of locations for a trainable transceiver according to an exemplary embodiment.

DETAILED DESCRIPTION

Figure 2A:
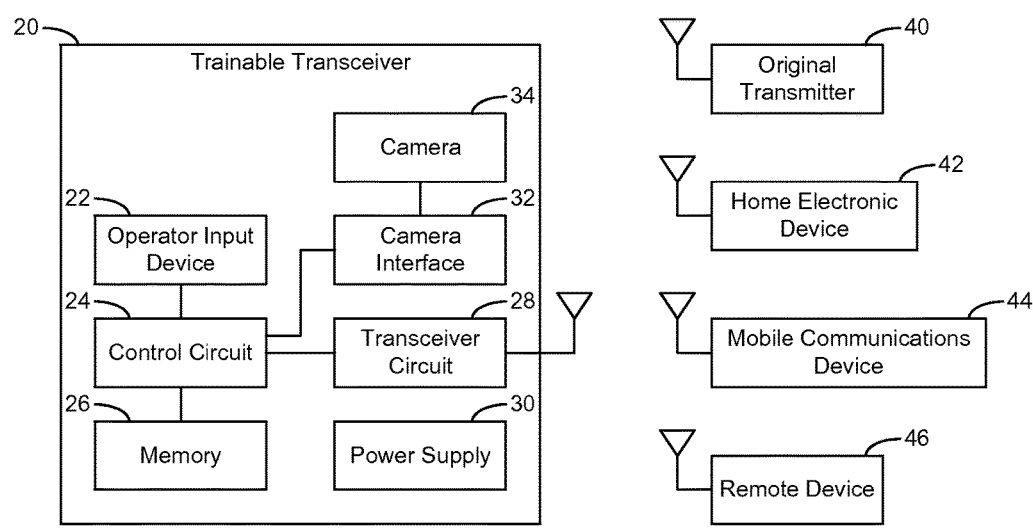
FIG. 2A illustrates a trainable transceiver, mobile communications device, original transmitter, home electronic device, and remote device according to an exemplary embodiment.

Generally, a trainable transceiver controls one or more home electronic devices and/or remote devices. For example, the trainable transceiver may be a Homelink™ trainable transceiver. Home electronic devices may include devices such as a garage door opener, gate opener, lights, security system, and/or other device which is configured to receive activation signals and/or control signals. A home electronic device need not be associated with a residence but can also include devices associated with businesses, government buildings or locations, or other fixed locations. Remote devices may include mobile computing devices such as mobile phones, smartphones, tablets, laptops, computing hardware in other vehicles, and/or other devices configured to receive activation signals and/or control signals.

Activation signals may be wired or, preferably, wireless signals transmitted to a home electronic device and/or remote device. Activation signals may include control signals, control data, encryption information (e.g., a rolling code, rolling code seed, look-a-head codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

In some embodiments, the trainable transceiver receives information from one or more home electronic devices and/or remote devices. The trainable transceiver may receive information using the same transceiver user to send activation signals and/or other information to home electronic devices and/or remote devices. The same wireless transmission scheme, protocol, and/or hardware may be used from transmitting and receiving. The trainable transceiver may have two way communication with home electronic devices and/or remote devices. In other embodiments, the trainable transceiver includes additional hardware for two way communication with devices and/or receiving information from devices. In some embodiments, the trainable transceiver has only one way communication with a home electronic device and/or remote device (e.g., sending activation signals to the device). The trainable transceiver may receive information about the home electronic device and/or remote device using additional hardware. The information about the home electronic device and/or remote device may be received from an intermediary device such as an additional remote device and/or mobile communication device.

A trainable transceiver may also receive information from and/or transmit information to other devices configured to communicate with the trainable transceiver. For example, a trainable transceiver may receive information from cameras (e.g., imaging information may be received) and/or other sensors. The cameras, and the information received therefrom, may assist in the training and/or operation of the trainable transceiver.

The cameras and/or other sensors may communicate with a trainable transceiver wirelessly (e.g., using one or more transceivers) or through a wired connection. In some embodiments, a trainable transceiver may communicate with mobile communications devices (e.g., cell phones, tablets, smartphones, or other communication devices). In still further embodiments, the trainable transceiver is configured to communicate with networking equipment such as routers, servers, switches, and/or other hardware for enabling network communication. The network may be the internet and/or a cloud architecture.

In some embodiments, the trainable transceiver transmits and/or receives information (e.g., activation signals, control signals, control data, status information, or other information) using a radio frequency signal. For example, the transceiver may transmit and/or receive radio frequency signals in the ultra-high frequency range, typically between 260 and 960 megahertz (MHz) although other frequencies may be used. In other embodiments, a trainable transceiver may include additional hardware for transmitting and/or receiving signals (e.g., activation signals and/or signals for transmitting and/or receiving other information). For example, a trainable transceiver may include a light sensor and/or light emitting element, a microphone and/or speaker, a cellular transceiver, an infrared transceiver, or other communication device.

A trainable transceiver may be configured (e.g., trained) to send activation signals and/or other information to a particular device and/or receive control signals and/or information from a particular device. The trainable transceiver may be trained by a user to work with particular remote devices and/or home electronic devices (e.g., a garage door opener). For example, a user may manually input control information into the trainable transceiver to configure the trainable transceiver to control the device. A trainable transceiver may also learn control information from an original transmitter. A trainable transceiver may receive a signal containing control information from an original transmitter (e.g., a remote sold with a home electronic device) and determine control information from the received signal. Training information (e.g., activation signal frequency, device identification information, encryption information, modulation scheme used by the device, or other information related to controlling a device via an activation signal) may also be received by a trainable transceiver from a remote device, mobile communications device, or other source.

Referring to FIG. 1, a trainable transceiver 20 may be mounted or otherwise attached to a vehicle 10 in a variety of locations. For example, the trainable transceiver 20 may be integrated into a dashboard or center stack (e.g., infotainment center) 12 of the vehicle 10. The trainable transceiver 20 may be integrated into the vehicle 10 by a vehicle manufacturer. A trainable transceiver may be located in other peripheral locations. For example, a trainable transceiver may be removably mounted to a visor 14. The trainable transceiver may include mounting hardware such as a clip. A trainable transceiver may be mounted to other surfaces of a vehicle (e.g., dashboard, windshield, door panel, or other vehicle component). For example, a trainable transceiver may be secured with adhesive. In some embodiments, a trainable transceiver is integrated in a rear view mirror 16 of the vehicle. A vehicle manufacturer may include a trainable transceiver in the rear view mirror.

In other embodiments, a vehicle 10 may be retrofit to include a trainable transceiver 20. This may include attaching a trainable transceiver 20 to a vehicle surface using a clip, adhesive, or other mounting hardware as described above. Alternatively, it may include replacing a vehicle component with one that includes an integrated trainable transceiver 20 and/or installing a vehicle component which includes an integrated trainable transceiver 20. For example, an aftermarket rear view mirror, vehicle camera system (e.g., one or more cameras and one or more display screens), and/or infotainment center may include an integrated trainable transceiver 20. In further embodiments, one or more components of a trainable transceiver 20 may be distributed within the vehicle 10.

Still referring to FIG. 1, the vehicle 10 may include one or more cameras. The trainable transceiver 20 may communicate with one or more cameras 18 and 19 of the vehicle 10. The camera may be included in the vehicle 10 for tasks such as providing a backup camera system, recording traffic incidents or other footage related to the vehicle, providing security, monitoring and/or measuring a vehicle's surrounding, and/or performing other camera related functions. Cameras may be installed by a vehicle manufacturer and/or be produced by an original equipment manufacturer. In other embodiments, cameras may be installed as an aftermarket addition to a vehicle. In some embodiments, the vehicle 10 may include a front facing camera 18 and/or a rear facing camera 19. A vehicle may include additional cameras. For example, a vehicle may include a plurality of rear facing cameras 19, a plurality of front facing cameras 18, cameras facing either side of the vehicle 10, cameras facing the below and/or above the vehicle 10, cameras facing the interior of the vehicle 10, and/or cameras located in other areas of the vehicle 10 internal and/or external to the vehicle 10 and viewing an internal portion of the vehicle 10 and/or viewing outside of and/or around the vehicle 10.

In some embodiments, the trainable transceiver 20 may communicate with cameras located in or on another vehicle, cameras mounted in or on a structure (e.g., a garage, home, office, and/or other building). In some embodiments, cameras may be integrated with vehicle 10 components. For example, a camera may be integrated with a rear view mirror.

Communication with the cameras 18 or 19 may allow the trainable transceiver 20 to perform a variety of tasks associated with controlling a home electronics device, remote device, vehicle remote start system, and/or other devices. For example, the cameras 18 or 19 may be used by the trainable transceiver 20 to identify a device (e.g., to be activated or trained-to) and format an activation signal to control that device. The cameras 18 or 19 may be used by the trainable transceiver 20 to determine if the vehicle 10 is well positioned within a garage and prevent a garage door opener from closing a garage door that would come into contact with the vehicle 10. The cameras 18 or 19 may be used to determine if a garage door is closed when the vehicle 10 is remote started and provide this information to the trainable transceiver 20 which may control the garage door opener and cause the garage door to be opened. Other functions as described herein may enhance the functionality of the trainable transceiver 20 by making use of a camera and/or other hardware or devices Referring now to FIG. 2A, the components of the trainable transceiver 20 are illustrated according to an exemplary embodiment. In one embodiment, the trainable transceiver 20 includes an operator input device 22. The operator input device 22 may be one or more buttons. For example, the operator input device may be three hard key buttons. In some embodiments, the operator input device 22 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action.

The operator input device 22 may display data to a user or other provide outputs. For example, the operator input device 22 may include a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output.

The operator input device 22 is connected to a control circuit 24. The control circuit 24 may receive input signals, instructions, and/or data from the operator input device. The control circuit 24 may process signals received from the operator input device 22. The control circuit 24 may also send information and or control signals or instructions to the operator input device 22. For example, the control circuit 24 may send output instructions to the operator input device 22 causing the display of an image.

The control circuit 24 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit may be a SoC individually or with additional hardware components described herein. The control circuit 24 may further include, in some embodiments, memory (e.g., random access memory, read only memory, flash memory, hard disk storage, flash memory storage, solid state drive memory, etc.). In further embodiments, the control circuit 24 may function as a controller for one or more hardware components included in the trainable transceiver. For example, the control circuit 24 may function as a controller for a touchscreen display or other operator input device, a controller for a transceiver, transmitter, receiver, or other communication device (e.g., implement a Bluetooth communications protocol).

The control circuit 24 is coupled to memory 26. Memory 26 may be used to facilitate the functions of the trainable transceiver described herein. Memory 26 may be volatile and/or non-volatile memory. For example, memory 26 may be random access memory, read only memory, flash memory, hard disk storage, flash memory storage, solid state drive memory, etc. In some embodiments, the control circuit 24 reads and writes to memory 26. Memory 26 may include computer code modules, data, computer instructions, or other information which may be executed by the control circuit 24 or otherwise facilitate the functions of the trainable transceiver 20 described herein. For example, memory 26 may include encryption codes, pairing information, identification information, a device registry, encryption instructions, training instructions, or other data or instructions configured to provide the activities noted herein.

The trainable transceiver 20 may further include a transceiver circuit 28 coupled to the control circuit 24. The transceiver circuit 28 allows the trainable transceiver 20 to transmit and/or receive wireless communication signals. The wireless communication signals may be transmitted to or received from a variety of wireless devices (e.g., original transmitter 40, home electronic device 42, mobile communications device 44, and/or remote device 46). The transceiver circuit 28 may be controlled by the control circuit 24. For example, the control circuit 24 may turn on or off the transceiver circuit 28; the control circuit may send data using the transceiver circuit 28, format information, an activation signal, control signal, and/or other signal or data for transmission via the transceiver circuit 28, or otherwise control the transceiver circuit 28. Inputs from the transceiver circuit 28 may also be received by the control circuit 24. In some embodiments, the transceiver circuit 28 may include additional hardware such as processors, memory, integrated circuits, antennas, etc. The transceiver circuit 28 may process information prior to transmission or upon reception and prior to passing the information to the control circuit 24. In some embodiments, the transceiver circuit 28 may be coupled directly to memory 26 (e.g., to store encryption data, retrieve encryption data, etc.). In further embodiments, the transceiver circuit 28 may include one or more transceivers, transmitters, receivers, etc. For example, the transceiver circuit 28 may include an optical transceiver, near field communication (NFC) transceiver, etc. In some embodiments, the transceiver circuit 28 may be implemented as a SoC (e.g., incorporating all or a plurality of the components shown in FIG. 2A).

When the control circuit 24 receives inputs from operator input devices 22 and processes the inputs, the inputs may be converted into control signals, data, inputs to be sent to the base station, or otherwise processed. The control circuit 24 may control the transceiver circuit 28 and use the transceiver circuit 28 to communicate (e.g., receive signals and/or transmit signals) with one or more of original transmitters 40, home electronic devices 42, mobile communication devices 44, and/or remote devices 46. The control circuit 24 may also be used to in the training process.

In further embodiments, the control circuit 24 is coupled to additional transceiver circuits, receivers, and/or transmitters. In one embodiment, the transceiver circuit 28 is used for communicating with (transmitting to and/or receiving from) home electronic devices and/or remote devices. Additional transceivers may be used to communicate with other devices (e.g., mobile communications devices, cameras, network devices, or other wireless devices). The transceiver circuit 28 and other transceivers may operate using different frequency, transmission spectrums, protocols, and/or otherwise transmit and/or receive signals using different techniques. For example, the transceiver circuit 28 may be configured to send activation signals to a home electronic device 42 (e.g., a garage door opener) using an encrypted radio wave transmission and an additional transceiver may communicate with a remote communications device 46 (e.g., a smartphone) using a Bluetooth transceiver and Bluetooth communications protocol.

The trainable transceiver 20 may communicate with original transmitters 40, home electronic devices 42, remote devices 46, mobile communications devices 44, network devices, and/or other devices as described above using the transceiver circuit 28 and/or other additional transceiver circuits or hardware. The devices with which the trainable transceiver 20 communicates may include transceivers, transmitters, and/or receivers. The communication may be one-way or two-way communication.

In one alternative embodiment, the trainable transceiver 20 is a distributed system. A remote user interface module may contain operator input devices, a power source, a control circuit, memory, output devices, and/or communications hardware. The remote user interface module may communicate with a base station located apart from the remote user interface module. For example, the remote user interface module may include a transceiver used to communicate with the base station. The base station may communicate with the remote user interface module using a transceiver circuit and/or an additional transceiver such as those discussed above. The remote user interface module may process user inputs and send information to a base station with a transceiver circuit configured to send an activation signal and/or other signal to another device. The base station may include a more powerful (e.g., longer range) transceiver than the transceiver(s) in the remote user interface module.

In some embodiments, the remote user interface module may contain a transceiver configured to allow communication between the remote user interface module and another device such as a remote device and/or mobile communications device. The remote user interface module may serve as a communication bridge between a remote device or mobile communications device and another device such as the base station or a home electronics device or remote device in communication with the base station.

With continued reference to FIG. 2A, the trainable transceiver 20 may include a power supply 30. The power supply 30 provides electrical power to the components of the trainable transceiver 20. In one embodiment, the power supply 30 is self-contained. For example, the power supply 30 may be a battery, solar cell, or other power source not requiring a wired connection to another source of electrical power. In other embodiments, the power supply 30 may be a wired connection to another power source. For example, the power supply 30 may be a wired connection to a vehicle power supply system. The power supply 30 may be integrated into the vehicle electrical system. This may allow the trainable transceiver 20 to draw electrical power from a vehicle battery, be turned on or off by a vehicle electrical system (e.g., turned off when the vehicle is turned off, turned on when a vehicle door is opened, etc.), draw power provided by a vehicle alternator, or otherwise be integrated with the electrical power systems(s) of the vehicle 10.

The trainable transceiver 20 may also include one or more camera interfaces 32. The camera interface 32 may include hardware components for interfacing with one or more cameras 34. For example, the camera interface 32 may include wiring, multiplexing circuitry, connectors, ports (e.g., universal serial bus (USB) ports, high-definition multimedia interface (HDMI) ports, video graphics array (VGA) ports, and/or other connections), buses, wireless communication hardware, and/or other components which allow one or more cameras 34 to communicate with the trainable transceiver 20. Camera interface 32 allows for communication between onboard cameras 34 and control circuit 24. Camera interface 32 may further or alternatively provide communication between remotely located cameras 34 and trainable transceiver 20. In some embodiments, the camera interface 32 includes hardware and/or software for handling camera input (e.g., image data), processing camera input, and/or generating output to one or more cameras 34 (e.g., control information). For example, the camera interface 32 may include circuitry, microprocessor, microcontroller, application-specific integrated circuit (ASIC), graphics processing unit (GPU), or other circuitry configured to perform various input/output, control, processing, and other functions to be described herein. In other embodiments, the camera interface 32 may be a SoC individually or with additional hardware components described herein. The camera interface 32 may further include, in some embodiments, memory (e.g., random access memory, read only memory, flash memory, hard disk storage, flash memory storage, solid state drive memory, etc.). In further embodiments, the camera interface 32 may be a controller for one or more cameras 34.

In some embodiments, the camera interface 32 is integral to and/or part of the control circuit 24. The control circuit 24 may perform the functions described herein with reference to the camera interface 32. In other embodiments, the camera interface 32 may be or be replaced by one or more cameras or sensors coupled to the control circuit 24. For example, cameras 34 may provide input to the control circuit 24 and/or receive outputs from the control circuit 24 directly without a camera interface 32 or other intermediate hardware components.

Input received by the camera interface 32 and/or control circuit 24 may include a frame buffer, sensor, data, image information, camera identification information (e.g., which camera front, rear, side, etc. is associated with the camera output), and/or other information and/or data output from one or more cameras. Input may be processed using algorithms stored in memory 26 and or processing circuits or elements such as those described above. Processing of information from one or more cameras (e.g., onboard cameras or remotely located cameras) may include digital imaging processing and/or digital signal analysis. This may include classification, feature extraction, pattern recognition, multi-scale signal analysis, reading a machine readable representation, and/or other use of algorithms and/or programs to process information from one or more cameras. In one embodiment, the camera interface 32 performs image processing. In other embodiments, image processing is performed by the control circuit 24.

The control circuit 24 and/or camera interface 32 may also provide output to one or more cameras directly or through the camera interface 32. Output may include control signals for turning on or off a camera, switching between camera inputs, focusing a camera, and/or otherwise controlling one or more cameras connected to the trainable transceiver 20. Output from the control circuit 24 and/or camera interface 32 may also include a frame buffer, image file, image data, camera identification information, and/or other information related to the input received from one or more cameras. For example, an image may be output to a display in communication with the trainable transceiver 20 and/or integrated into the trainable transceiver 20. The trainable transceiver 20 may transmit image information (e.g., an image file, frame buffer(s), etc.) to one or more devices in communication with the trainable transceiver 20. For example, the trainable transceiver 20 may transmit an image to a home electronic device 42, remote device 46, mobile communication device 44, network device, and/or other device configured to receive transmissions from the trainable transceiver 20.

Figure 2B:
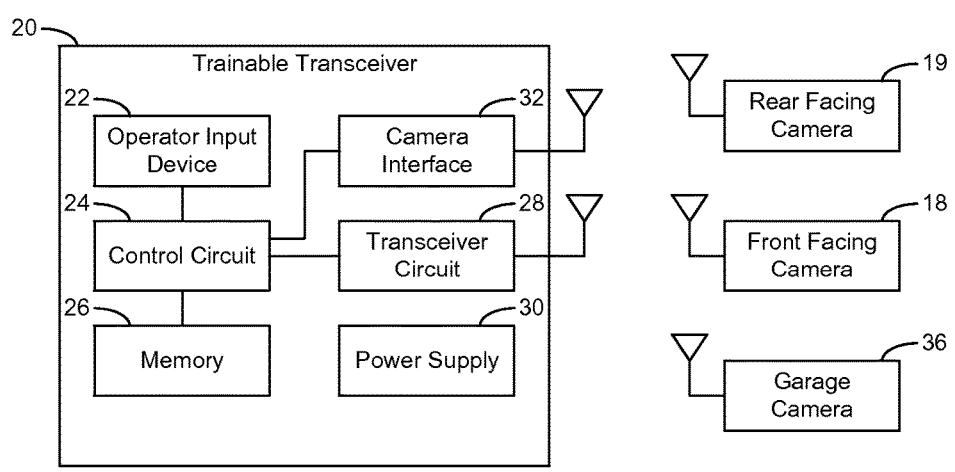
FIG. 2B illustrates an embodiment of a trainable transceiver having a camera interface for communicating with a camera.

Referring now to FIG. 2B, the camera interface 32 may communicate wirelessly with one or more cameras associated with the vehicle 10, such as the front facing camera 18, the rear facing camera 19, or a garage camera 36. In some embodiments, the camera interface 32 includes or is a wireless receiver or transceiver configured to communicate wirelessly with one or more cameras. For example, the camera interface 32 may include a radio frequency transceiver (e.g., configured to operate at a specific frequency such as 2.4 GHz), and the cameras may include a radio frequency transceiver. The radio frequency transmissions between the camera and the camera interface 32 may be encrypted or otherwise secured. In other embodiments, the camera and the camera interface 32 may communicate using other protocols, transmission spectra, and/or communication hardware. For example, the camera interface 32 may include or be a wireless router and the cameras may be internet protocol cameras.

Figure 2C:
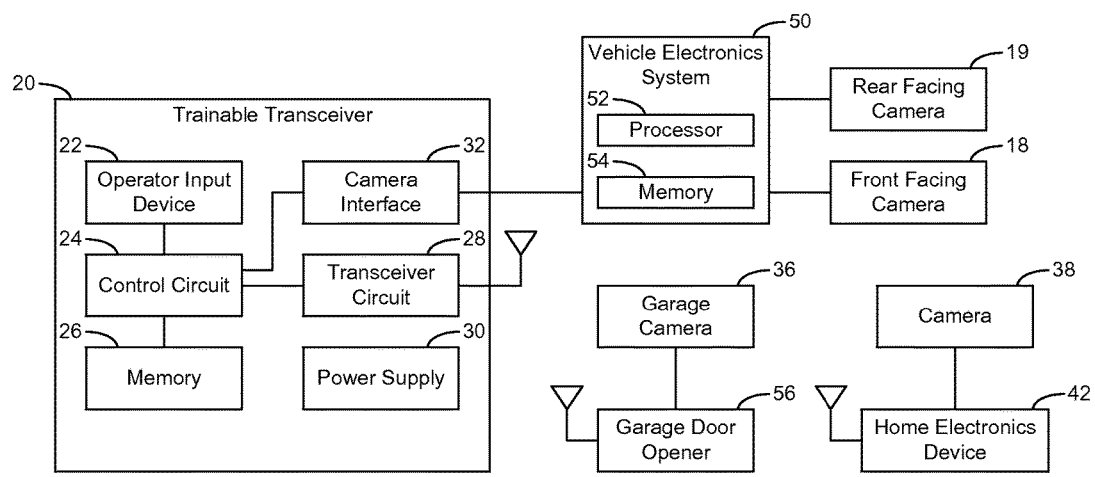
FIG. 2C illustrates an embodiment of a trainable transceiver in communication with a vehicle electronics system.

Referring now to FIG. 2C, a trainable transceiver is illustrated, according to an exemplary embodiment, including a connection to a vehicle electronics system 50 including one or more cameras (e.g., front facing camera 18 and rear facing camera 19). The vehicle electronics system 50 may include processors 52 (e.g., electronic control units (ECU), engine control modules (ECM), or other vehicle processors), memory 54, buses (e.g., controller area network (CAN) bus, sensors, on-board diagnostics equipment (e.g., following the (OBD)-II standard or other protocol), cameras, displays, infotainment systems, transceivers, and/or other components integrated with a vehicle's electronics systems 50 or otherwise networked (e.g., a controller area network of vehicle components). In one embodiment, the camera interface 32 of the trainable transceiver 20 is in communication with the CAN bus of the vehicle. Communication with the CAN bus of the vehicle may provide for the trainable transceiver 20 access to the front facing camera 18, the rear facing camera 19, and/or other camera integrated with the vehicle electronic system 50. The camera interface 32 and/or control circuit 24 may retrieve image data from the cameras, control the cameras, and/or otherwise interact with the cameras. In some embodiments, components of the vehicle electronics system 50 may process (e.g., using one or more vehicle processors 52) data or information form one or more cameras (e.g., garage camera 36, rear facing camera 19, from facing camera 18, camera 38, etc.). For example, the vehicle electronics system 50 may create a frame buffer, image file, or other image data based on input received by one or more onboard cameras (e.g., rear facing camera 19, from facing camera 18, etc.). In one embodiment, the camera interface 32 and/or control circuit 24 of the trainable transceiver 20 receives processed data or information related to the cameras from the vehicle electronics system 50. For example, the camera interface 32 may read frame buffer data from memory 54 included in the vehicle electronics system 50.

In some embodiments, the trainable transceiver 20 receives information related to a camera located outside the vehicle. For example, a camera or cameras 36 may be located in a garage. In some embodiments, cameras are configured to transmit images and/or image information to a garage door opener 56. For example, cameras 36 may be in wireless communication with the garage door opener 56. Alternatively, cameras 36 may be wired to the garage door opener 56 and provide images and/or image data to the garage door opener 56 through wired communication. In some embodiments, the garage door opener 56 may include an integral camera or camera otherwise coupled to the garage door opener 56 (e.g., mounted on the garage door opener 56 and in communication with the garage door opener 56). The garage door opener 56 may in turn provide images and/or image data to the trainable transceiver 20 by sending a wireless signal using a transceiver. The wireless signal may be received by the transceiver circuit 28 of the trainable transceiver 20. In other embodiments, the garage door opener 56 may communicate with the trainable transceiver 20 using one or more intermediary devices and/or additional hardware.

Images and/or image data may be transmitted from a camera and/or device coupled to a camera using intermediate devices and/or hardware. In one embodiment, the cameras are internet protocol (IP) cameras and/or the garage door opener 56 includes hardware to connect to the internet (e.g., a networking device allowing wired or wireless communication with network equipment such as a router, switch, modem, or other device). In other embodiments, the cameras 36 or garage door opener 56 include a wireless transceiver such as a radio frequency transceiver, Bluetooth transceiver, cellular transceiver, or other communications device. The above described hardware may allow the cameras 36 and/or the garage door opener 56 to transmit images and/or image data for reception by the trainable transceiver 20.

In some embodiments, the images and/or image data are received by an intermediate device other than the trainable transceiver 20 which then communicates the images and/or image data to the trainable transceiver 20. For example, the images and/or image data may be received by a mobile communications device using a cellular transceiver and/or internet access. The images and/or image data may then by communicated to the trainable transceiver 20 using the transceiver circuit 28 or an additional transceiver such as a Bluetooth transceiver. Alternatively, the images and/or image data may be received by a mobile communications device and transmitted to a vehicle electronics system 50 (e.g., a smartphone may be paired to a vehicle infotainment system and communicate using a Bluetooth protocol). The information received by the infotainment system may be accessed by the trainable transceiver 20 using a connection to the vehicle electronics system 50 (e.g., a camera interface 32 or other hardware). In further embodiments, a remote device may be used to receive the images and/or image data and transmit it to the trainable transceiver 20. Similarly, the images and/or image data may be received by a vehicle using a cellular transceiver and/or internet connection and the information accessed by the trainable transceiver 20 through a connection to the vehicle electronics system 50. In alternative embodiments, the trainable transceiver 20 may include a transceiver for directly receiving images and/or image data from a camera, device coupled to a camera, or an intermediate device. For example, the trainable transceiver 20 may include a cellular transceiver and/or connection to the internet allowing for wireless communication with a camera, device coupled to a camera, or an intermediate device.

In some embodiments, a home electronic device 42 is a camera, security system, or other device coupled to or including a camera 38. For example, a security system may include one or more cameras and/or IP cameras. The security system may be configured to communicate with or connect to the internet. In some embodiments, the security system may include hardware for wireless communication such as a radio frequency transceiver, cellular transceiver, or other device. Home electronic devices 42 may include gate openers coupled to one or more cameras 38, lighting systems with light sensors and/or cameras, etc. The home electronic device 42 may provide images and/or image data received from one or more cameras 38 to the trainable transceiver 20 by sending a wireless signal using a transceiver. The wireless signal may be received by the transceiver circuit 28 of the trainable transceiver 20. In other embodiments, the home electronic device 42 may communicate with the trainable transceiver 20 using one or more intermediary devices and/or additional hardware. The home electronics device 42 may communicate with the trainable transceiver 20 using any of the techniques described above with reference to the garage door opener 56.

A camera included in or otherwise in communication (e.g., wired or wireless access to image data from a camera) with a remote device and/or mobile communications device may provide images and/or image data to the trainable transceiver using communication hardware incorporated in the coupled device. In some embodiments, a remote device and/or mobile communications device is coupled to or includes a camera. For example, a laptop, smartphone, tablet, game console, webcam, desktop computer, or other device may include an integrated camera and/or be coupled to a camera. Remote devices and/or mobile communications devices may communicate images and/or image data to the trainable transceiver 20. In some embodiments, remote devices and/or mobile communication devices include a transceiver which allows for communication with the trainable transceiver 20 (e.g., using the transceiver circuit 28 or an additional transceiver of the trainable transceiver 20). In other embodiments, remote devices and/or mobile communications devices communicate with the trainable transceiver 20 using one or more intermediate devices and/or additional hardware. A home electronics device 42 (e.g., a remote device) may communicate with a trainable transceiver 20 using any of the techniques described above with reference to a garage door opener Communication between the trainable transceiver 20, a camera, and/or intermediate devices and/or hardware, as described above, may be unidirectional or bidirectional. For example, the trainable transceiver 20 may send a request for images and/or image data to a camera and/or intermediate device. The camera and/or intermediate device may then send the requested information to the trainable transceiver 20 directly or through an intermediate device. Alternatively, the communication between the trainable transceiver 20 and the camera and/or intermediate device may be unidirectional as regards images and/or image data. For example, the trainable transceiver 20 may send an activation signal, control signal, and/or other information to a device using the transceiver circuit 28 without including a request for images and/or image data. A home electronics device, remote device, network device, and/or mobile communications device may be programmed to transmit images and/or image data in response to an action triggered by the activation or other signal and/or in response to receiving an activation or other signal. The trainable transceiver 20 may receive images and/or image data using one or more of the above described techniques.

Figure 2D:
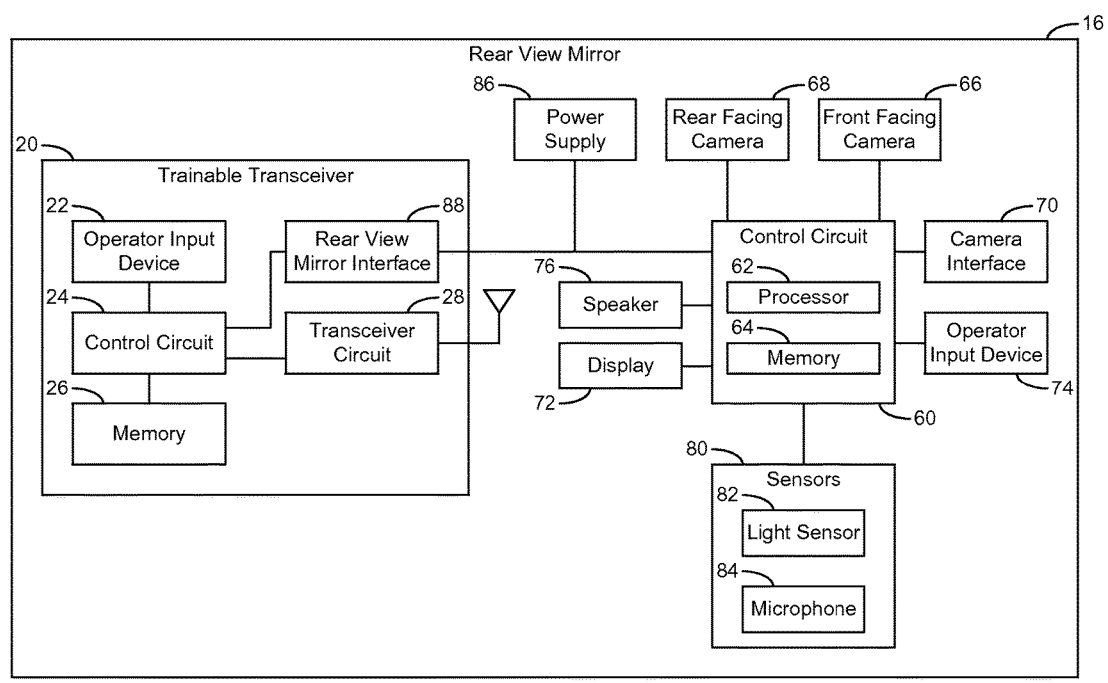
FIG. 2D illustrates a trainable transceiver coupled to a rear view mirror of a vehicle according to an exemplary embodiment.

Referring now to FIG. 2D, a trainable transceiver coupled to rear view mirror hardware is illustrated according to an exemplary embodiment. The trainable transceiver 20 may be coupled to or otherwise included in the rear view mirror 16. Advantageously, this may allow the trainable transceiver 20 to use hardware associated with the rear view mirror 16 rather than duplicating the same hardware for use with the trainable transceiver 20. This may save cost, simplify the manufacturing process, and/or otherwise improve the trainable transceiver system 20. The rear view mirror 16 may be installed in the vehicle 10 as part of an original vehicle manufacturing process, as an additional piece of hardware, as part of a retrofit instillation, to replace an existing mirror, or otherwise be added to the vehicle 10. The rear view mirror 16 may be uninstalled in the vehicle (e.g., packaged for sale for later installation in the vehicle 10).

In one embodiment, the rear view mirror 16 includes a control circuit 60. The control circuit 60 may contain circuitry, hardware, and/or software for facilitating and/or performing the functions described herein. The control circuit 60 may handle inputs, process inputs, run programs, handle instructions, route information, control memory, control a processor, process data, generate outputs, communicate with other devices or hardware, and/or otherwise perform general or specific computing tasks. In some embodiments, the control circuit 60 includes a processor 62. The processor 62 may be implemented as a general-purpose processor, an application specific integrated circuit (ASIC), one or more field programmable gate arrays (FPGAs), a digital-signal-processor (DSP), a group of processing components, or other suitable electronic processing components.

In some embodiments, the control circuit includes memory 64. Memory 64 is one or more devices (e.g. RAM, ROM, Flash Memory, hard disk storage, etc.) for storing data and/or computer code for facilitating the various processes described herein. Memory 64 may be or include non-transient volatile memory or non-volatile memory. Memory 64 may include database components, object code components, script components, or any other type of information structure for supporting various activities and information structures described herein. Memory 64 may be communicably connected to the processor and provide computer code or instructions to processor for executing the processes described herein.

In some embodiments, the rear view mirror 16 includes one or more front facing cameras 66 and/or one or more rear facing cameras 68. The front facing camera 66 may be used alone or in conjunction with the control circuit 60 of the rear view mirror 16 to perform a variety of functions. For example, the front facing camera 66 may be used to provide driver aids such as automatically dimming headlights when oncoming cars are detected (e.g., by the headlights of the oncoming car), detecting if the vehicle 10 is in its own lane, detecting rain or other weather, detecting a possible collision with another vehicle or object, recognizing traffic signs (e.g., extracting information from an image including a traffic sign), detecting pedestrians, and/or otherwise assisting a driver. The rear facing camera 68 may be used alone or in conjunction with the control circuit 60 of the rear view mirror 16 to perform a variety of functions. For example, the rear facing camera 68 may be used as to determine when to dim the rear view mirror 16, as a backup camera, to detect objects behind the vehicle 10, to provide an image of the vehicle surroundings while reversing, and/or to otherwise assist a driver of the vehicle 10. In further embodiments, the rear view 16 mirror includes a camera which is positioned to record images of the interior of the vehicle 10. The rear view mirror 16 can contain circuits configured to use image information received at one or more cameras to complete and/or trigger the various activities (e.g., auto dimming, headlight adjustment, etc.) described in this paragraph.

In some embodiments, the front facing camera 66 is integrated with the housing or another portion of the rear view mirror 16. For example, the camera 66 may be located within the portion of the housing behind the mirror. Alternatively, the front facing camera 66 may be located in a portion of the rear view mirror housing which connects the mirror to the windshield and/or head liner. The camera 66 may be protected by the housing which contacts the windshield at locations surrounding the camera. The rear facing camera 68 may be integrated with the housing of the rear view mirror such that the rear facing camera has a line of sight to the rear window of the vehicle.

The front facing camera 66 and/or the rear facing camera 68 may be wired to a camera interface 70 in the rear view mirror 16 and/or wired to the control circuit 60 of the rear view mirror 16. In some embodiments, the camera interface 70 allows the rear view mirror 16 to receive images and/or image data from cameras remote to the rear view mirror 16. For example, the camera interface 70 may receive images and/or image data from a camera located on the front bumper of the vehicle, on the rear bumper of the vehicle, in a license plate frame, or other remote location. In some embodiments, the camera interface 70 receives images and/or image data via a wired connection with the camera remote to the rear view mirror 16. In other embodiments, the camera interface 70 receives images and/or image data wirelessly from one or cameras located remote from the rear view mirror 16. The camera interface 70 may include one or more wireless transceivers.

In one embodiment, the rear view mirror 16 includes a display 72. The display 72 allows for visual communication with a user. The display 72 may be configured to output a visual representation based on computer instructions, control signals, computer code, frame buffers, and/or other electronic signals or information. In some embodiments, the display 72 includes a graphics processing unit (GPU), controller, and/or other hardware to facilitate the handling of and display of graphics information. In other embodiments, the display 72 does not include hardware for processing images or image data. The display 72 may be any hardware configured to display images using the emission of light or another technique. For example, the display 72 may be a liquid crystal display, e-ink display, plasma display, light emitting diode (LED) display, or other display device. In some embodiments, the display 72 may be part of or otherwise integrated with a user input device 74 such as a touchscreen display (e.g., projected capacitance touchscreen, resistance based touchscreen, and/or touchscreen based on other touch sensing technology). The display 72 may be a touchscreen display. In some embodiments, the display 72 is controlled by the control circuit 60 of the rear view mirror 16. The display 72 may be used for functions such as displaying weather information, backup camera video feeds, warnings, compass heading, road information (e.g., current speed limit), navigation information, vehicle information (e.g., if a passenger is not wearing a seat belt), or information accessible by the vehicle and/or a vehicle connected device (e.g., paired smartphone). The display 72 may be located behind the glass of the mirror assembly itself. The display 72 may be used to display images, but, when not in use, function as part of the mirror allowing a user to see towards the rear of the vehicle.

In some embodiments, the rear view mirror 16 includes an operator input device 74. The operator input device 74 may allow a user to provide inputs to the control circuit of the rear view mirror. The operator input 74 device may include soft keys (touch screens, projected capacitance based buttons, resistance based buttons, etc.) and/or hard keys (e.g., buttons, switches knobs, etc.), microphones, and/or other hardware configured to accept user inputs. The operator input device 74 may allow a user to control functions associated with the rear view mirror 16 such as dimming, turning on or off auto dimming, placing an emergency call, etc. The operator input device 74 of the rear view mirror 16 is coupled to the control circuit 60 of the rear view mirror 16. The rear view mirror 16 may process inputs received from the operator input device 74 (e.g., change the display, dim the mirror, play a sound using the speaker, or otherwise take an action, process the input, and/or generate an output).

In some embodiments, the rear view mirror includes one or more speakers 76. Speakers 76 may provide audio output. The sound produced by the speaker 76 may be audible to an occupant within the vehicle 10. The speaker 76 provides audio output to an occupant for a variety of functions. For example, the speaker 76 may provide an audible output to convey a warning, a phone call, communication with service providers (e.g., emergency services, roadside assistance, or other telematics systems), confirmation of an input, instructions on using the rear view mirror, or other information.

The rear view mirror 16 may include one or more sensors 80. For example, the rear view mirror 16 may include light sensors 82, temperature sensors, accelerometers, humidity sensors, microphones 84, and/or other sensors. Sensors 80 may be used to display information to an occupant of the vehicle 10 (e.g., current weather conditions) using the display 72 of the rear view mirror 16 and/or other displays in the vehicle 10 (e.g., center stack display, gauge cluster display, heads up display (HUD), etc.). Sensors 80 may also be used to accept user input and/or measure parameters related to the vehicle 10. For example, the microphone 84 may be used to accept voice commands from an occupant of the vehicle 10. The accelerometer may be used to measure vehicle dynamics and/or accept physical inputs from a user moving, adjusting, coming into contact with, bumping, shaking, or otherwise manipulating the rear view mirror. Sensor data may be processed, received, sent to other hardware, and/or otherwise manipulated by the control circuit 60 of the rear view mirror 16.

In one embodiment, the rear view mirror 16 includes a power supply 86. The power supply 86 may be a replaceable or rechargeable battery. In other embodiments, the power supply 86 may be a connection to a vehicle electrical system. For example, the components of the rear view mirror 16 may draw electrical power from a CAN bus, vehicle battery, vehicle alternator, and/or other vehicle system to which the components of the rear view mirror 16 are electrically connected.

In other embodiments, the rear view mirror 16 includes an integral transceiver, such as a cellular transceiver, Bluetooth transceiver, etc., or a connection to a transceiver coupled to the vehicle in which the rear view mirror 16 is or will be mounted. Using this transceiver and/or additional hardware, the rear view mirror 16 may have or be capable of providing access to the internet and/or communication to other devices and/or hardware (e.g., using radio frequency transmissions).

In one embodiment, the trainable transceiver 20 includes a rear view mirror interface 88. The rear view mirror interface 88 may allow for communication between the trainable transceiver 20 and the control circuit 60 of the rear view mirror 16. In one embodiment, rear view mirror interface 88 includes physical connection such as ports, connectors, wiring, and/or other hardware used to create an electrical connection between the control circuit 24 of the trainable transceiver 20 and the control circuit 60 of the rear view mirror 16. In alternative embodiments, the control circuit 24 of the trainable transceiver 20 and the control circuit 60 of the rear view mirror 16 are directly connected (e.g., wired such that outputs from one control circuit are received as inputs at the other control circuit and/or vice versa). In further embodiments, the rear view mirror interface 88 may include and/or be implemented by computer programming, code, instructions, or other software stored in memory in the trainable transceiver 20 and/or rear view mirror 16. Advantageously, the connection between the trainable transceiver 20 and the rear view mirror 16 may allow for components of the rear view mirror 16 to serve two or more functions thus increasing the usefulness of these components, reducing cost, and/or eliminating the need for duplicate components to provide additional functions to the trainable transceiver 20. For example, the front facing camera 66 of the rear view mirror 16 may be used for functions such as automatically dimming the headlights (e.g., brights) of the vehicle 10 when the headlights of an oncoming vehicle are detected by the front facing camera 66 and/or control circuit 60. The front facing camera 66 may also be used for functions of the trainable transceiver 20 described in more detail with reference to later figures such as identifying a garage door opener.

The connection between the trainable transceiver 20 and the rear view mirror hardware may allow the trainable transceiver 20 to control the hardware included in the rear view mirror 16, send control signals and/or instructions to the control circuit 60 of the rear view mirror 16, receive images and/or image data from the camera(s) (e.g., cameras 66 and 68) included in the rear view mirror 16 (e.g., via the control circuit of the rear view mirror), receive control signals and/or instructions, receive sensor information from sensors 80 included in the rear view mirror 16 (e.g., via the control circuit 60 of the rear view mirror 16), and/or otherwise interact with the rear view mirror 16 and/or components thereof.

The trainable transceiver 20 may be configured to control, communicate, or otherwise operate in conjunction with the control circuit 60 of the rear view mirror 16 to facilitate and/or perform the functions described herein. In one embodiment, the trainable transceiver 20 communicates with the control circuit 60 of the rear view mirror through a rear view mirror interface 88. In other embodiments, the trainable transceiver 20 communicates with the control circuit 60 of the rear view mirror 16 directly (e.g., the control circuit 24 of the trainable transceiver 20 communicates with the control circuit 60 of the rear view mirror 16). The trainable transceiver 20 may communicate and/or control the control circuit 60 of the rear view mirror 16 using a variety of techniques. For example, the trainable transceiver 20 may communicate with the rear view mirror 16 through outputs from the trainable transceivers 20 received as inputs at the control circuit 60 of the rear view mirror 16, sending the rear view mirror 16 a location in memory 64 which contains information instructions, data, or other information which is read by the control circuit 60 of the rear view mirror 16, sending the control circuit 60 of the rear view mirror 16 data, instructions, or other information through a bus, port, or other connection, or otherwise providing instructions, data, or information to the control circuit 60 of the rear view mirror 16.

In some embodiments, the control circuit 60 of the rear view mirror 16 communicates with the control circuit 24 of the trainable transceiver 20 using the same of similar techniques. In other embodiments, the communication is one way with the trainable transceiver 20 sending instructions, data, or other information to the control circuit 60 of the rear view mirror 16. The trainable transceiver 20 may extract data, instructions, or other information from the control circuit 60 of the rear view mirror 16 by reading the memory 64 of the rear view mirror 16 and/or requesting from the control circuit 60 of the rear view mirror 16 an address for a location in memory 64 in which the relevant information can be read. Alternatively, the control circuit 60 of the rear view mirror 16 may send information to the trainable transceiver 20 but only when requested by the trainable transceiver 20.

In some embodiments, the trainable transceiver 20 receives images and/or image data from one or more cameras in communication with the rear view mirror 16 (e.g., through the control circuit 60 and/or camera interface 70 of the rear view mirror 16). The trainable transceiver 20 may request, receive, and/or otherwise access images and/or image data from cameras in communication with the rear view mirror 16 using the rear view mirror interface 88. Alternatively, the control circuit 24 of the trainable transceiver 20 may request, receive, and/or otherwise access images and/or image data from cameras in communication with the rear view mirror 16 directly without the rear view mirror interface 88 in some embodiments. The trainable transceiver 20 may use images and/or image data received from the rear view mirror 16 to facilitate and/or perform the functions described herein.

Advantageously, retrieving images from the front facing camera 66 in the rear view mirror housing may provide better image quality than images from other front facing cameras 18 (e.g., bumper mounted cameras). The front facing camera 66 mounted in the rear view mirror housing is protected by the glass of the windshield from damage (e.g., due to abrasion from particles from the road or other sources). Additionally, the front facing camera 66 mounted in the rear view mirror 16 is likely to have a less obstructed view than other cameras as the windshield wipers clear water, debris, and/or other obstructions which may obscure the camera's field of view. This may provide the trainable transceiver 20 with more accurate images and/or higher quality images for use in the functions described herein.

In one embodiment, the trainable transceiver 20 is configured to provide output to a vehicle occupant using the display 72 and/or speaker 76 of the rear view mirror 16. The trainable transceiver 20 may control the output of the rear view mirror 16 by sending control signals, instructions, information, and/or data to the rear view mirror 16 or otherwise control the display 72 and/or speaker 76 of the rear view mirror 16. In one embodiment, the trainable transceiver 20 controls the output of the rear view mirror 16 using the rear view mirror interface 88. For example, the rear view mirror interface 88 may format instructions, control signals, and/or information such that it can be received and/or processed by the control circuit 60 of the rear view mirror 16. In other embodiments, the control circuit 24 of the trainable transceiver 20 may communicate directly with the control circuit 60 of the rear view mirror 16. The control circuit 60 of the rear view mirror 16 may handle, process, output, forward and/or otherwise manipulate instructions, control signals, data, and/or other information from the trainable transceiver 20. In other embodiments, the control circuit 60 of the rear view mirror 16 forwards, routes, or otherwise directs the instructions, control signals, outputs, data, and/or other information to other components of the rear view mirror 16 without additional processing or manipulation. For example, the trainable transceiver 20 may output a frame buffer to the control circuit 60 of the rear view mirror 16 which then routes the frame buffer to the display 72 without further manipulation. This may include storing the frame buffer in memory 64 included in the control circuit 60 of the rear view mirror 16 and sending an address corresponding to the frame buffer to the display 64. As described in greater detail with respect to later figures, the display 72 may be used by the trainable transceiver 20 to communicate information to a vehicle occupant regarding a home electronics device, remote device, mobile communication device, or other device controlled by and/or in communication with the trainable transceiver 20.

Advantageously, displaying information related to the trainable transceiver 20 using the display 72 of the rear view mirror 16 may make a user more likely to view the information. Vehicle occupants, particularly the driver, are accustomed to looking at the rear view mirror 16 frequently. A vehicle driver may be particularly likely to look at the rear view mirror 16 while reversing out of a garage and/or down a driveway. As such, a vehicle driver is more likely to see information from the trainable transceiver 20 related to a home electronics device (e.g., a garage door opener) if the information is displayed on the rear view mirror 16 rather than in another location.

The same or similar techniques as described above may be used to control the speaker 76 of the rear view mirror 16 for use with the trainable transceiver 12. As described in greater detail with respect to later figures, the speaker 76 may be used by the trainable transceiver 20 to communicate information to a vehicle occupant regarding a home electronics device, remote device, mobile communication device, or other device controlled by and/or in communication with the trainable transceiver 20.

The trainable transceiver 20 may be configured to receive inputs from the sensors 80 of the rear view mirror 16 and/or control sensors of the rear view mirror 16. The trainable transceiver 20 may access sensor data and/or control sensor data through the rear view mirror interface 88 and/or the control circuit 60 of the rear view mirror 16. In other embodiments, sensor data may be accessed and/or sensors controlled by the control circuit 24 of the trainable transceiver 20 and/or the control circuit 60 of the rear view mirror 16. The trainable transceiver 20 may receive sensor data and process, transmit, format, send data to other devices, and/or otherwise manipulate the sensor data. The trainable transceiver 20 may also control sensors. For example, the trainable transceiver 20 may turn sensors on or off, calibrate sensors, and/or otherwise manipulate sensors. In some embodiments, the trainable transceiver 20 receives commands, instructions, data, and/or other information through one or more sensors. For example, the trainable transceiver 20 may receive voice commands from a user through the microphone 84. Continuing the example, data may be optically received using the light sensor 82. In some embodiments, the trainable transceiver 20 receives information (e.g., information input through physical interaction with the rear view mirror) through the accelerometer of the rear view mirror.

In some embodiments, the trainable transceiver 20 receives inputs from the operator input device 74 of the rear view mirror 16 (e.g., via the control circuit 60 of the rear view mirror 16 and/or the rear view mirror interface 88). The trainable transceiver 20 may send a control signal, instructions, information or otherwise communicate with the control circuit 60 of the rear view mirror 16 to cause inputs to be communicated to the trainable transceiver 20. The trainable transceiver 20 may use the operator input device 74 of the rear view mirror 16 to augment or replace the operator input device 22 associated with the trainable transceiver 20.

In some embodiments, the trainable transceiver 20 draws electrical power through a connection with the power supply 86 included in the rear view mirror 16. As explained above, the power supply 86 may provide power to the rear view mirror 16 from the electrical system of the vehicle and/or a battery. The trainable transceiver 20 may draw power from the power supply 86 as well. For example, the trainable transceiver 20 may be connected to the power supply 86 through the rear view mirror interface 88. Alternatively, components of the trainable transceiver 20 may draw power from direct connections to the power supply 86. In other embodiments, the trainable transceiver 20 draws power from the control circuit 60 of the rear view mirror 16 which in turn draws power from the power supply 86.

In one embodiment, the trainable transceiver 20 may use the transceiver included in the rear view mirror and/or coupled to the rear view mirror (e.g., a transceiver mounted in the vehicle) to send and/or receive activation signals, control signals, images, image data, and/or other information. For example, the trainable transceiver 20 may configure the transceiver and/or control circuit 60 of the rear view mirror 16 such that images and/or image data from a remote camera may be received (e.g., a camera included in or coupled to a home electronic device). In other embodiments, the trainable transceiver 20 may use the transceiver to access the internet and/or other device (e.g., home electronic devices, remote devices, mobile communications devices, networking devices, etc.). This may allow the trainable transceiver 20 to receive images and/or image data from remote cameras. For example, the trainable transceiver 20 may access, through the transceiver and/or internet) an IP camera located remote from the vehicle 10 and retrieve images and/or image data.

The trainable transceiver 20 may be physically attached to or otherwise included in the rear view mirror 16. In one embodiment, the trainable transceiver 20 may be added to or otherwise installed by wiring the rear view mirror interface and/or other components to one or more components of the rear view mirror 16 (e.g., the power supply 86, and/or the control circuit 60). As part of a retrofit instillation, the trainable transceiver 20 may be physically coupled to the rear view mirror 16. For example, a housing containing one or more components of the trainable transceiver 20 may be coupled to a housing of the rear view mirror 16. In other embodiments, the trainable transceiver 20 (e.g., one or more components of the trainable transceiver 20) may be a module or package included within the housing of the rear view mirror 16. For example, the trainable transceiver 20 may be attached to rear view mirror hardware (e.g., the rear view mirror interface 88 wired to the power supply 86 and/or the control circuit 60 of the rear view mirror 16), and the trainable transceiver 20 and rear view mirror hardware placed within a single housing.

Figure 2E:
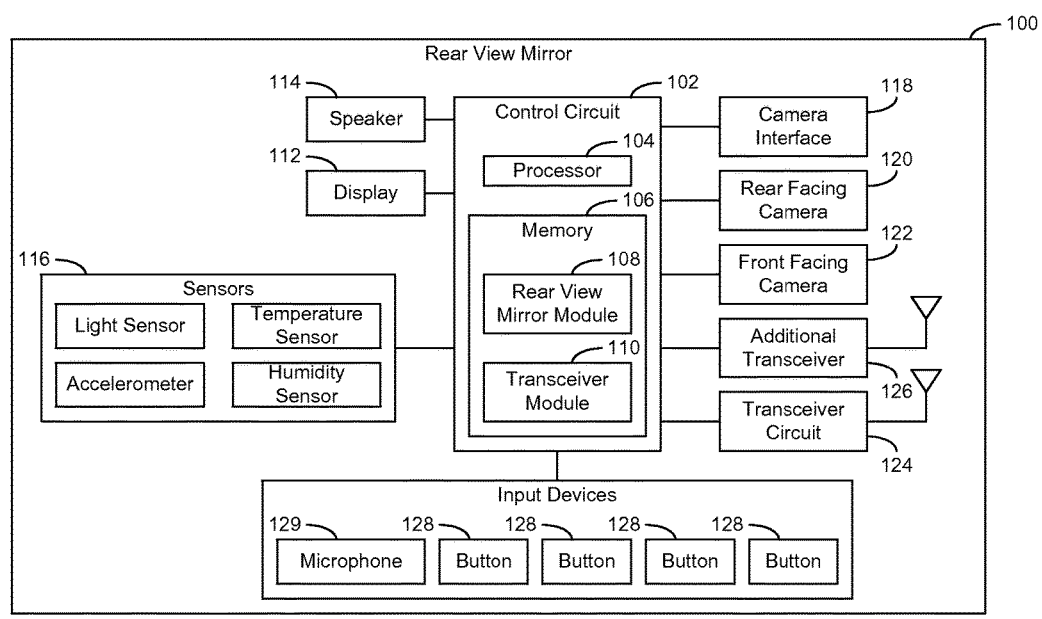
FIG. 2E illustrates a trainable transceiver sharing one or more components with a rear view mirror of a vehicle according to an exemplary embodiment.

Referring now to FIG. 2E, an exemplary embodiment of an integrated trainable transceiver and rear view mirror is illustrated as an integrated system 100. The unique components of the trainable transceiver 20 may be integrated with the components of a rear view mirror in the integrated system 100. Advantageously, this allows the rear view mirror 100 to have the functionality of the trainable transceiver 20 described herein and for the trainable transceiver to use components of the rear view mirror system as described herein thereby avoiding duplicative components and reducing cost. In one embodiment, the components associated with the trainable transceiver 20 and the components associated with the rear view mirror 16 are located within a rear view mirror housing or housings. The components may be packaged together as a single rear view mirror. In other embodiments, components of the integrated system may be located remote from one another, in different housings, or otherwise be part of a distributed system.

In some embodiments, the functions of both the trainable transceiver and the rear view mirror may be facilitated and/or performed using a single control circuit 102. The single control circuit 102 may include a processor 104 and memory 106 which is shared by the functions of the trainable transceiver and the functions of the rear view mirror. In some embodiments, the memory 106 of the single control circuit 102 includes a rear view mirror module 108 containing database components, object code components, script components, or any other type of information structure for supporting various activities and information structures related to the functions of the rear view mirror. The memory may include a transceiver module 110 containing database components, object code components, script components, or any other type of information structure for supporting various activities and information structures related to the functions of the trainable transceiver. Thus, a single control circuit 102 may support and/or carry out the functions described herein in reference to the trainable transceiver and the functions of the rear view mirror. In some embodiment, the control circuit 102 allocates resources (e.g., processing, memory, control of other hardware components, and/or other hardware and software resources) between functions associated with the trainable transceiver and functions associated with the rear view mirror.

The integrated trainable transceiver and rear view mirror may include some or all of the components described above with reference to FIG. 2D. For example, the integrated system 100 may include a display 112, speaker 114, sensors 116, camera interface 118, rear facing camera 120, and/or front facing camera 122. These components may have the same functions with respect to the trainable transceiver and the rear view mirror as described above.

In one embodiment, the integrated system 100 includes a transceiver circuit 124. The transceiver circuit 124 may be used, as previously described, to send activation signals and/or communicate with home electronic devices, remote device, mobile communications device, network device, or other hardware. The integrated system 100 may also include one or more additional transceivers 126 as previously described. Additional transceivers 126 may allow for and/or facilitate communication between the integrated system 100 and other devices. In one embodiment, the additional transceiver 126 is or includes a cellular transceiver and/or other hardware providing the integrated system with access to the internet. Advantageously, including a transceiver circuit 124 and/or additional transceiver 126 in one or more rear view mirror housings may locate the transceiver in a good location for improving reception and/or transmission of wireless signals. The integrated system 100 including the rear view mirror and therefore the transceiver may be positioned high on the vehicle and be at least partially surrounded by glass. This may improve transmission and/or reception range, quality, and/or other characteristics.

In one embodiment, the input devices of the integrated system are shared between functions related to the rear view mirror and functions related to the trainable transceiver. For example, a single button 128 may provide input related to either the trainable transceiver or the rear view mirror depending on which function controls the resource. For example, a single button 128 may cause the control circuit 102 to dim the mirror when the control circuit 102 treats the button 128 as a resource related to the rear view mirror functions, and the same button 128 may cause the control circuit 102 to send an activation signal using the transceiver circuit 124 when the control circuit 102 treats the button 128 as a resource related to the trainable transceiver functions. Advantageously, this may allow the integrated system 100 to share buttons 128 or other input devices for different functions and thereby simplify the system and/or reduce cost. The same sharing of hardware components may apply to input devices such as a microphone 129 and/or output devices such as the display 112 and/or speaker 114. The control circuit 102 may arbitrate inputs based on a variety of factors. For example, the control circuit 102 may take into account, inputs selecting which function the user wishes to control (e.g., a button to switch between functions, what function the previous input, output, or other action was related to, geographic proximity to a device controlled by the functions of the trainable transceiver, and/or other factors).

Using the above described hardware, software, and/or other components, a trainable transceiver may perform a variety of functions. These functions may enhance the usability, convenience, and/or otherwise improve a trainable transceiver system from the user's perspective. The trainable transceiver may be any of the embodiments discussed above (e.g., stand alone, coupled to a rear view mirror, integrated with a rear view mirror, etc.) and/or be a combination of any of the components described above.

Figure 3:
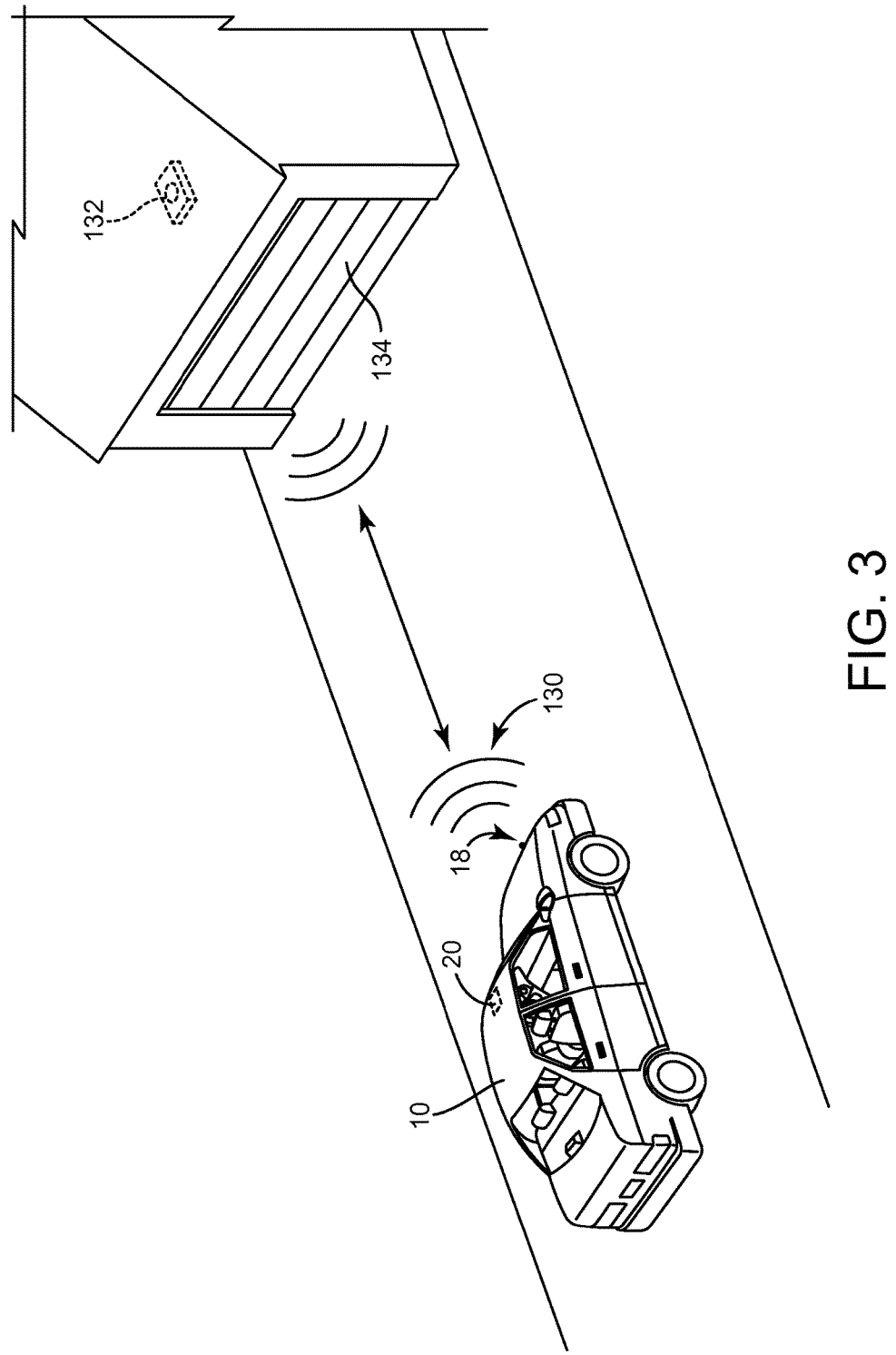
FIG. 3 illustrates a trainable transceiver communicating with a home electronics device based in part on an image and/or image data received from a camera.

Referring now to FIG. 3, an embodiment of the trainable transceiver 20 is illustrated sending an activation signal 130 to a garage door opener 132 (e.g., home electronics device). In one embodiment, the trainable transceiver 20 automatically sends an activation signal to the garage door opener 132 when the corresponding garage door 134 has been detected. The garage door 134 may be detected, differentiated, and/or otherwise recognized by the trainable transceiver 20 using one or more images and/or image data from a camera (e.g., the forward facing camera 18). Images and/or image data may be received by the control circuit and analyzed using image processing techniques, image processing algorithms, object/image recognition techniques or algorithms, object detection algorithms, and/or other image analysis techniques. The image(s) and/or image data provided by one or more cameras may be compared to one or more comparison images of the garage door 134.

The comparison images may be images of the garage door 134 corresponding to a garage door opener 132 for which activation signal information (e.g., frequency, encryption information, etc.) is known. These comparison images may be stored in memory local to the trainable transceiver 20 and/or vehicle 10, stored in a remote database (e.g., a server) and accessed by the trainable transceiver 20 through wireless communication, and/or otherwise made accessible to the control circuit of the trainable transceiver 20. Activation signal information may be stored along with the corresponding comparison image such that the activation signal information may be retrieved for a corresponding comparison image when a sensed image is found to match the comparison image.

If the image from the camera is determined to match (e.g., within a tolerance) the comparison image, the trainable transceiver 20 sends an activation signal 130 formatted based on the activation signal information corresponding to the comparison image. The activation signal 130 may be formatted using activation signal information retrieved from the storage location in which the comparison image is stored. For example, if a sensed image is determined to match a comparison image stored in local memory, the control circuit may read the local memory to retrieve the activation signal information corresponding to the comparison image. Using the parameters contained within the activation signal information, the control circuit may format a control signal to be sent by the transceiver circuit such that the activation signal 130 will control or otherwise communicate with the garage door opener 132 corresponding to the comparison image (and sensed image from the camera). The sensed image from the camera may be from any camera mounted in or on the vehicle. Images from multiple cameras may be analyzed. In one embodiment, the control circuit analyzes only images from the front or rear facing cameras of the vehicle. In further embodiments, the control circuit only analyzes images from the front facing camera 18. Alternatively, the control circuit may be configured to analyze images only from the rear facing camera.

In some embodiments, the control circuit analyses images form one or more cameras continuously. In other embodiments, the control circuit activates one or more cameras at intervals in order to capture images for processing. For example, images may be analyzed every thirty seconds. Other intervals are possible.

In some embodiments, the trainable transceiver stops analyzing images upon sending an activation signal. The trainable transceiver may stop analyzing images when it has detected that it is outside of a geographic boundary associated with a device the trainable transceiver is trained to control. In further embodiments, the trainable transceiver may stop analyzing images after a period of time and/or a set number of failed comparisons.

In some embodiments, the comparison image(s) of the garage door controlled by the garage door opener are stored (e.g., in memory of the trainable transceiver) when the trainable transceiver is trained to the garage door opener. For example, during the training process, a user may be instructed to position the vehicle, in which the trainable transceiver is located, in front of the garage door for which the trainable transceiver is being trained to operate. The trainable transceiver may then store one or more images from the camera(s) to be used as comparison images during operation of the trainable transceiver as described above. In some embodiments, a trainable transceiver which has already been trained to a garage door opener may be further trained to operate automatically using the image based techniques described herein. For example, a user may be prompted to position the vehicle in front of the garage door which the trainable transceiver is trained to operate. Upon pushing a button, speaking a command, or otherwise providing a user input an image may be captured and stored in memory for use as a comparison image. In other embodiments, the image may be captured and stored automatically.

In further embodiments, a user may provide an image from a source other than the vehicle. For example, a user may capture an image of the garage door using a camera such as a digital camera, smartphone camera, or other image capturing device. The image may be provided to the trainable transceiver by a user uploading the image through an internet connection, transferring the image to the trainable transceiver (e.g., transferring the image from a smartphone to the trainable transceiver using a Bluetooth transceiver), uploading the image to a server or other database (e.g., using a web browser interface) which the trainable transceiver may access, and/or otherwise providing the image for use by the trainable transceiver.

The same or similar techniques may be used to store a geographic location of the garage door opener. This location may be used as described above to create a geographic boundary in which the trainable transceiver analyzes images to determine if they match the comparison image.

In further embodiments, activation signals, control signals, and/or other information may be communicated with additional home electronic devices, remote devices, mobile communications device, network devices, and/or other devices when the trainable transceiver detects a garage door using one or more cameras. The same techniques described above may be used to automatically or otherwise control these devices. For example, upon detecting a garage door which matches the comparison image, the trainable transceiver may send an activation signal to a security system (e.g., disarming the security system), home lighting device (e.g., turning on the lights in a home), security gate (e.g., closing the gate behind the vehicle), appliance (e.g., turning on a television), remote device (e.g., turning on a laptop computer), etc. Any device configured to be controlled by and/or communicate with the trainable transceiver may have functions which are triggered automatically when the trainable transceiver determines that a sensed image matches a comparison image. In some embodiments, multiple activation signals or other communication signals may be sent to a plurality of devices upon detection of a single image. For example, the trainable transceiver may store a single comparison image for use with multiple devices such that when a sensed image is determined to match the comparison image, multiple activation signals are sent. Each activation signal may correspond to one of the devices using the same comparison image.

In some embodiments, the comparison image may be an image other than of a garage door. Advantageously, this allows a user to have automatic control over one or more devices even if the user does not have a garage. For example, the comparison image may be an image of a street sign, home, gate, building, mailbox, parking structure, or other object. An image of any object may be used. In some embodiments, the trainable transceiver may ensure that the object is positioned such that when detected, the device to be controlled by the trainable transceiver (e.g., home electronic device) is within range of the transceiver circuit. For example, the trainable transceiver may send a test signal during training.

Figure 4A:
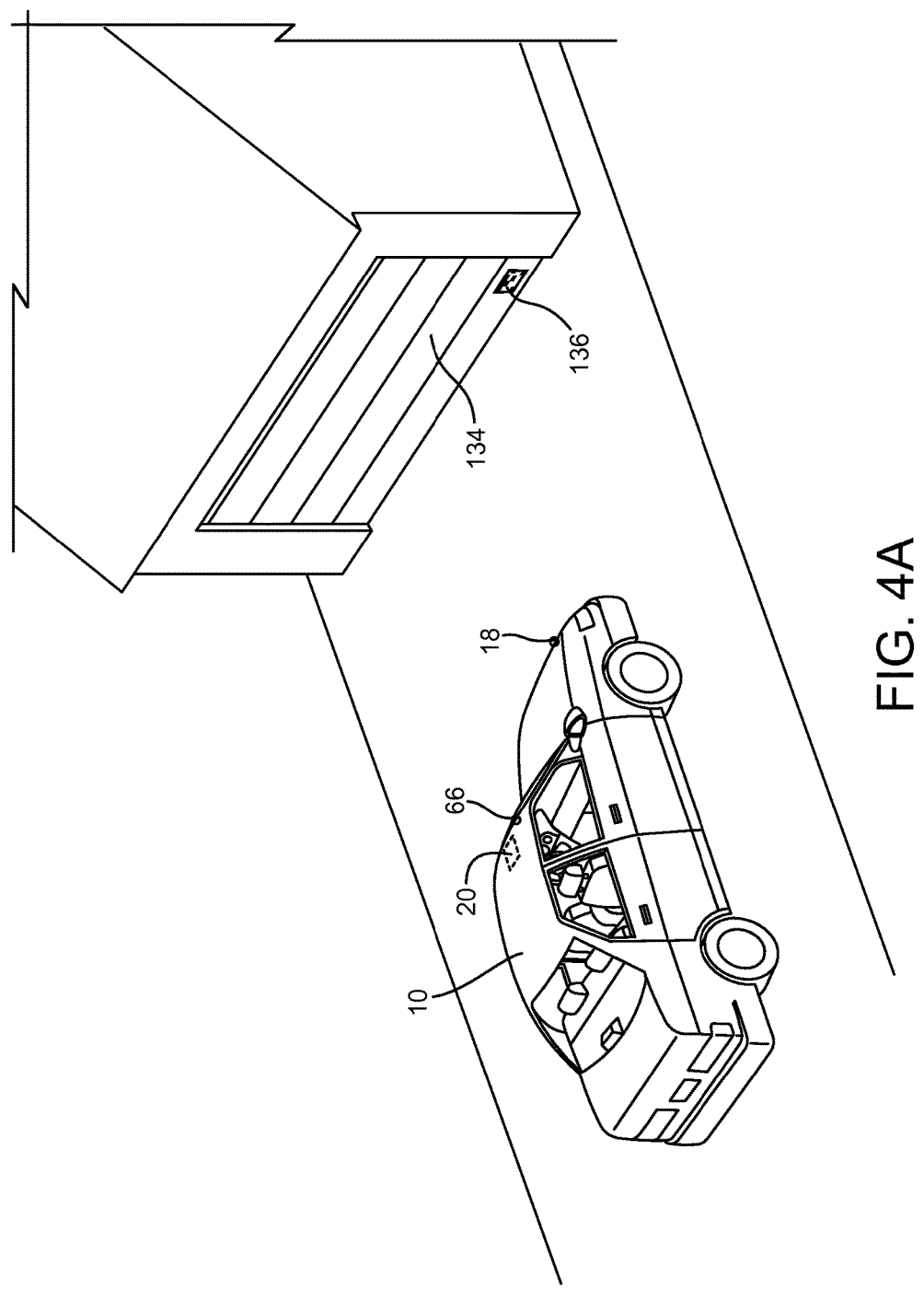
FIG. 4A illustrates a machine readable image that may be read by a trainable transceiver coupled to a camera according to an exemplary embodiment.
Figure 4B:
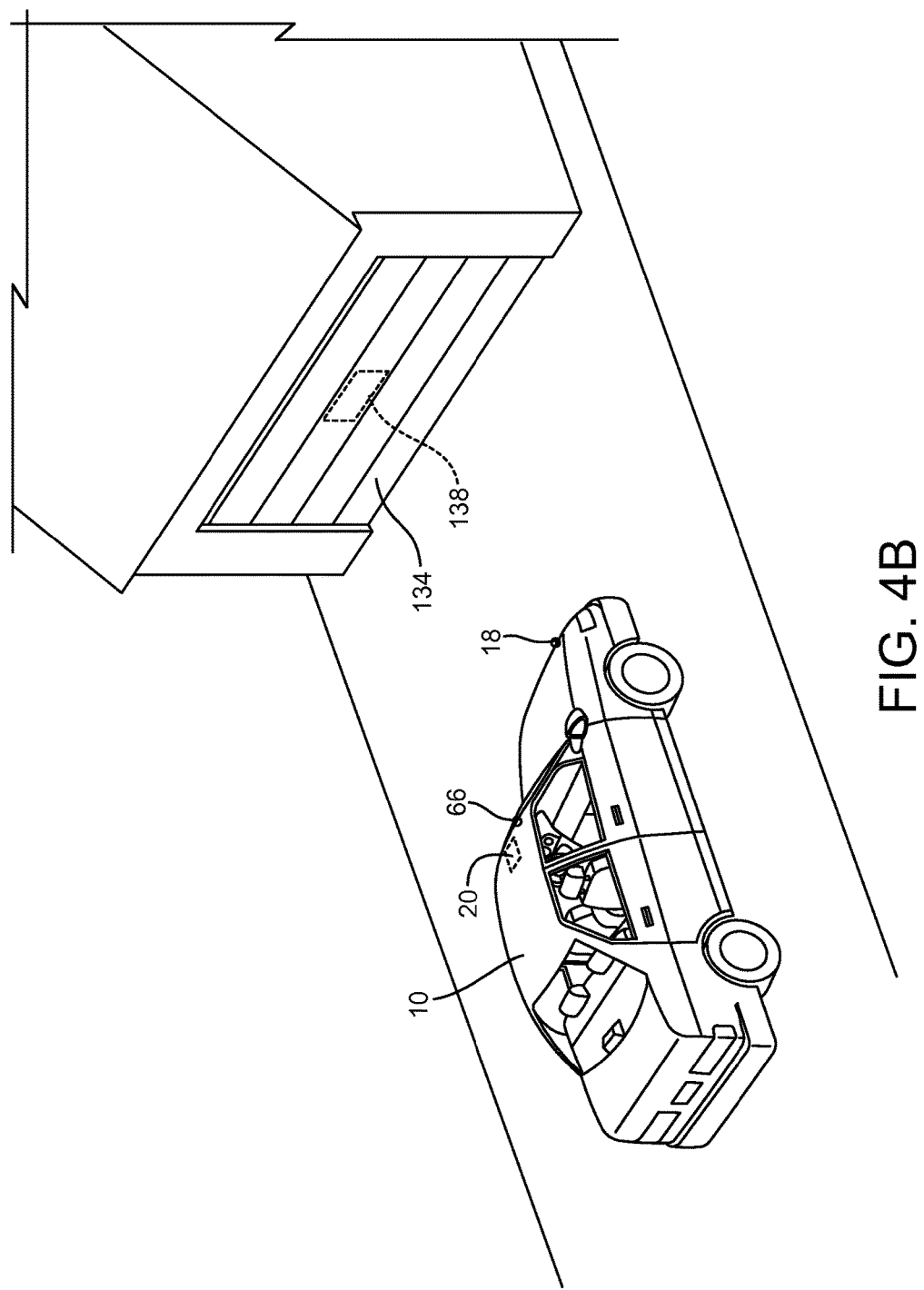
FIG. 4B illustrates an invisible image that may be read by a trainable transceiver coupled to a camera according to an exemplary embodiment.

Referring now to FIGS. 4A-4B, the trainable transceiver may detect a garage door 134 corresponding to a garage door opener based on an image 136 on the garage door 134 in some embodiments. Advantageously, detecting a particular image 136 on a garage door 134 may require less computing resources, be more accurate, provide a greater amount of information, or otherwise be preferable to detecting a garage door 134 based on an image of the garage door 134 itself.

In one embodiment, the garage door 134 includes a machine readable image 136 as illustrated in FIG. 4A. The machine readable image 136 may be read by the trainable transceiver and one or more cameras in communication in the trainable transceiver 20 (e.g., a front facing camera 66 mounted in the rear view mirror 16). In some embodiments, the machine readable image 136 includes encoded data or other information. For example, the machine readable image 136, when read, may provide information related to the home electronics device, remote device, mobile communications device, and/or other device to which the machine readable image 136 corresponds. The information may include or be related to activation information, control information, frequencies, encryption information, identification information, and/or other information. The machine readable image 136 may itself be encrypted. For example, the machine readable image may be a barcode, quick response (QR) code, matrix barcode, and/or other machine readable image.

In one embodiment, the trainable transceiver 20 may determine if the machine readable image 136 matches a comparison image stored in memory. The comparison image may be provided to the trainable transceiver 20 using a technique described above. In response to determining that the machine readable image 136 matches a comparison image, the trainable transceiver 20 may act in any of the ways described above.

In some embodiments, the trainable transceiver 20 determines, from the machine readable image 136, the identity of the device to which the machine readable image 136 corresponds. For example, the trainable transceiver reads the machine readable image 136 using a camera, decodes the information encoded in the machine readable image 136, and determines the identity of the device corresponding to the machine readable image 136. The trainable transceiver 20 may use the identity of the device to read from memory or otherwise obtain information for formatting an activation signal for controlling the device. For example, the trainable transceiver 20 may retrieve from memory information stored during the training process related to frequency, encryption, etc. The trainable transceiver 20 may then format an activation signal (e.g., using the control circuit) and transmit the formatted activation signal using the transceiver circuit.

The trainable transceiver 20 may be trained to operate using the machine readable image 136 using one or more of the techniques described above with reference to FIG. 3. In other embodiments, the trainable transceiver 20 may be provided with identification information when it is trained to operate a home electronic device. The identification information may be stored in memory corresponding to information related to the activation signal for the device. The identification information and/or activation signal information may be stored in memory local to the trainable transceiver 20 and/or in a remote location (e.g., a server or database) accessible to the trainable transceiver 20 (e.g., through an internet connection, cellular connection, etc.). The trainable transceiver 20, upon reading a machine readable image, may attempt to match the identification information from the image to identification information stored in memory. In a match is found, the activation signal information stored in memory corresponding to the identification information may be used to format an activation signal for use with the device. In alternative embodiments, the identification information corresponding to a device may be provided by a user using a device in communication with the trainable transceiver 20 (e.g., a smartphone communicating using a Bluetooth transceiver), through the internet (e.g., provided to a server r database by a user through a web browser), or otherwise provided to the trainable transceiver 20 or made accessible.

Referring now to FIG. 4B, the machine readable image and/or other image is invisible to the human eye in some embodiments. The image, object, and/or machine readable image 138 used by the trainable transceiver 20 as described above may be visible to a camera (e.g., camera 18 or camera 66) but be invisible to the human. Advantageously, the invisible image 138 may be more aesthetically pleasing than a visible image. The invisible image 138 may also provide an advantage by keeping the encoded information more secure than if it was visible to any person passing by the image. In some embodiments, the image 138 is made up of invisible ink, security ink, or a similar substance. The image 138 may be visible only in the ultraviolet spectrum. In some embodiments, the camera(s) accessible by the trainable transceiver 20 are configured to detect, receive, process, and/or otherwise operate in the ultraviolet spectrum. This may be in addition to or in place of operating in the visible spectrum. In some embodiments, an additional camera for detecting the image is included in the vehicle 10, trainable transceiver 20, rear view mirror 16, or is otherwise configured to provide images in the ultraviolet spectrum to the trainable transceiver 20. In other embodiments, the image 138 may be formed by ink visible in the infrared spectrum. The frequency of the light reflected from, produced from, generated by, or otherwise resulting from the ink or other substances or materials used to create the image 138 may be outside the visible spectrum and be a frequency which is detected by the CCD and/or CMOS sensors used in one or cameras. In other embodiments, ink is used to block one or more of ultraviolet light and infrared light. The camera may sense an image formed by the lack of ultraviolet and/or infrared light produced form the garage door 134 or other object onto which the ink has been placed.

Figure 4C:
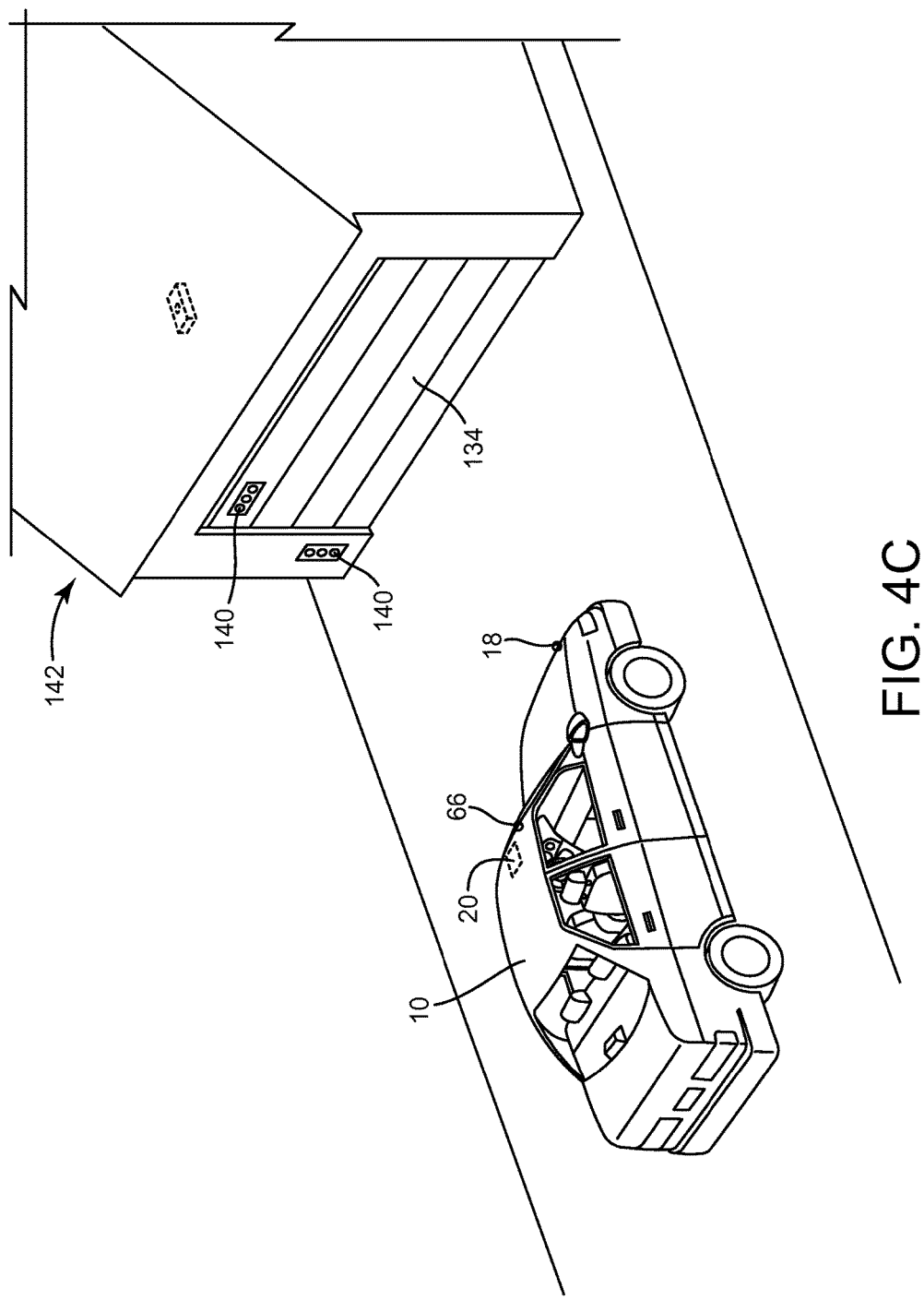
FIG. 4C illustrates an exemplary embodiment of a home electronics device coupled to infrared light emitting diodes which transmit information which may be received by a trainable transceiver coupled to a camera.

Referring generally to FIGS. 4A-4C, the image used to identify the home electronics device, remote device, network device, or other device may be generated by a user of the trainable transceiver 20 in some embodiments. This may allow a user to retrofit an existing garage door opener or other device such that it may be automatically controlled by the trainable transceiver 20 using camera detection of the image. For example, a user may provide a comparison image taken with a camera, apply an invisible ink to the garage door or other object, attach a sticker to the garage door or other object which includes a machine readable image (either a visible image 136 or invisible image 138), or otherwise provide a way to identify a device controlled by the trainable transceiver 20. In other embodiments, ink, a sticker, or image may be provided with a garage door opener or other device which identifies the device. In further embodiments, the garage door or other object may include a preprinted visible or invisible image which identifies a device associated with the object.

Referring not to FIG. 4C, a home electronic device, remote device, or other device configured to be controlled by the trainable transceiver may include one or more light sources 140 which produce light in a spectrum other than visible light. For example, the light source 140 may produce infrared light, ultraviolet light, or otherwise produce non-visible electromagnetic radiation. The light source 140 may be mounted on a garage door 134, garage 142, or other location with a line of sight to a camera associated with a vehicle 10. In some embodiments, the light from the light source 140 is used to identify the corresponding device to the trainable transceiver 20 (e.g., by transmitting, using light, identification information to a camera or other sensor). The light source 140 may be coupled to the device it identifies. The device may control and or power the light source 140. In some embodiments, the light source 140 is battery powered or otherwise not electrically coupled to the device it identifies. For example, the light source 140 may be wired to the electrical system of a home or other structure and be wirelessly controlled by the device it identifies. In other embodiments, the device does not control the light source 140. For example, the light source 140 may continuously produce a signal which identifies the device. The light source 140 may transmit data such as control data, activation signal frequency, encryption information (e.g., a rolling code, fixed code, or other information related to an encryption technique), identification information, data, and/or other information related to the corresponding home electronics device, remote device, or other device. Information may be transmitted using the light source 140 based on the frequency with which the light source 140 is turned on and off, the duration of the light source 140 being on and/or off, the characteristics of the light emitted (e.g., wavelength), and/or other techniques used to transmit information using light. The frequency of the light may be outside the visible spectrum and be a frequency which is detected by the CCD and/or CMOS sensors used in one or cameras.

As described with reference to FIG. 3 above, a single machine readable image 136, invisible image 138, light source 140 and/or other source of identification may identify a plurality of devices. The trainable transceiver 20 may send a plurality of activation signals upon reading a single machine readable image 136, detecting a single invisible image 138, and/or receiving information from a light source 140.

Figure 5A:
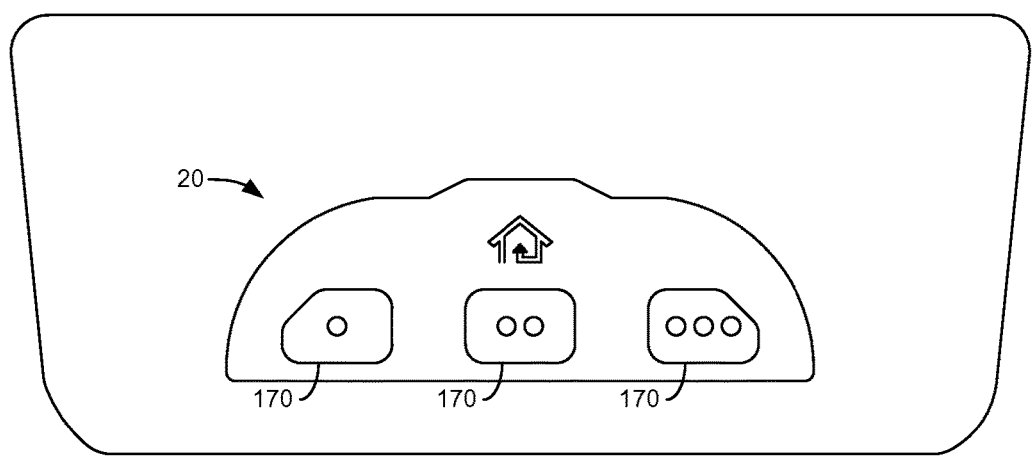
FIG. 5A illustrates a trainable transceiver having three input buttons according to an exemplary embodiment.

Referring now to FIG. 5A, a trainable transceiver 20 having three input buttons 170 is illustrated according to an exemplary embodiment. In some embodiments, the trainable transceiver 20 automatically sends an activation signal as described above with reference to FIG. 3. The buttons 170 of the trainable transceiver 20 may be configured to activate the devices the trainable transceiver 20 is trained to control. The buttons 170 may allow a user to manually activate the device rather than relying on the trainable transceiver 20 to automatically send the activation signal. The buttons 170 may be a redundant set of controls. In other embodiments, the trainable transceiver 20 does not automatically send an activation signal. For example, one button 170 may be configured to operate multiple devices with each device at a different location (e.g., the left button 170 may operate a garage door opener at a home and a different garage door opener at a vacation home). Upon a user pressing the button 170, the trainable transceiver 20 may determine which activation signal to send using one of the previously described techniques. For example, the trainable transceiver 20 may determine to send the control signal for operating the garage door opener at the vacation home based on image of the associated garage door from a camera matching a comparison image stored in memory which corresponds to the garage door opener for the vacation home. Multiple buttons 170 may have multiple location dependent functions with the proper activation signal being determined using one of the above described techniques.

Figure 5B:
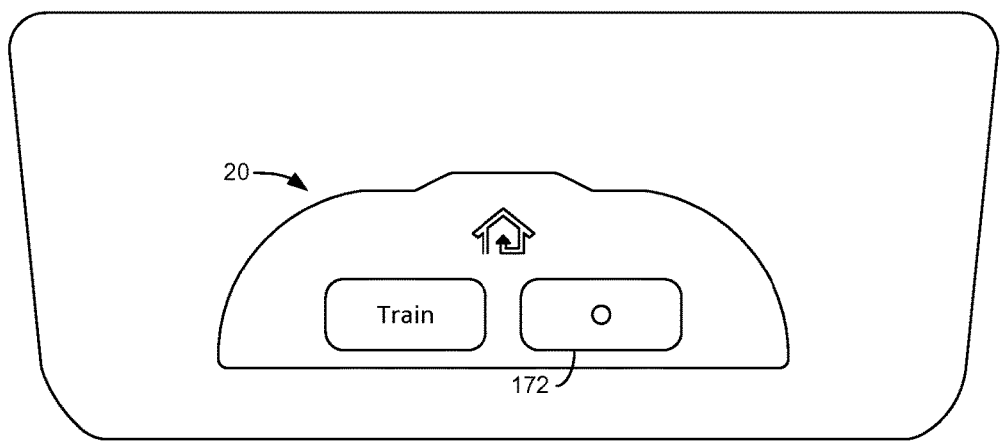
FIG. 5B illustrates a trainable transceiver having a multiple channel button.

Referring now to FIG. 5B, a trainable transceiver 20 having a single multiple channel button 172 is illustrated according to an exemplary embodiment. In some embodiments, the trainable transceiver 20 does not automatically identify and/or send activation signals as described above with reference to FIG. 3. The trainable transceiver 20 may attempt to identify a home electronic device, remote device, and/or other devices upon receiving a user input (e.g., a button press). Upon receiving the input, the trainable transceiver 20 may activate one or more cameras, receive images form one or more cameras, request images from one or more cameras, and/or otherwise access current images and/or image data from one or more cameras. The trainable transceiver 20 may then use one or more of the techniques described above to identify a device which the trainable transceiver has been trained to control. For example, the trainable transceiver 20 may compare a sensed image of a garage door to a stored comparison image of the garage door corresponding to the garage door opener the trainable transceiver 20 has been trained to control. Upon identifying a device the trainable transceiver 20 is trained to control, the trainable transceiver 20 may format and/or send an activation signal to the device.

Advantageously, the single multiple channel button 172 may allow a user to control a plurality of devices with a single input button or other device. The trainable transceiver 20 used the identification techniques previously described to discriminate between devices it is trained to control in order to control the device the used wants to control based on the images and/or image data from one or cameras. Thus, a user may control multiple devices with a single input and control the desired device based on the location of the vehicle (e.g., what images and/or objects the camera(s) associated with the vehicle detect). In some embodiments, the trainable transceiver 20 may discriminate between devices without using GPS positioning information. For example, the trainable transceiver 20 may discriminate between devices using only camera based techniques. This may provide an advantage as the trainable transceiver 20 would not require additional hardware such as a GPS transceiver and would therefore be simpler.

Figure 6:
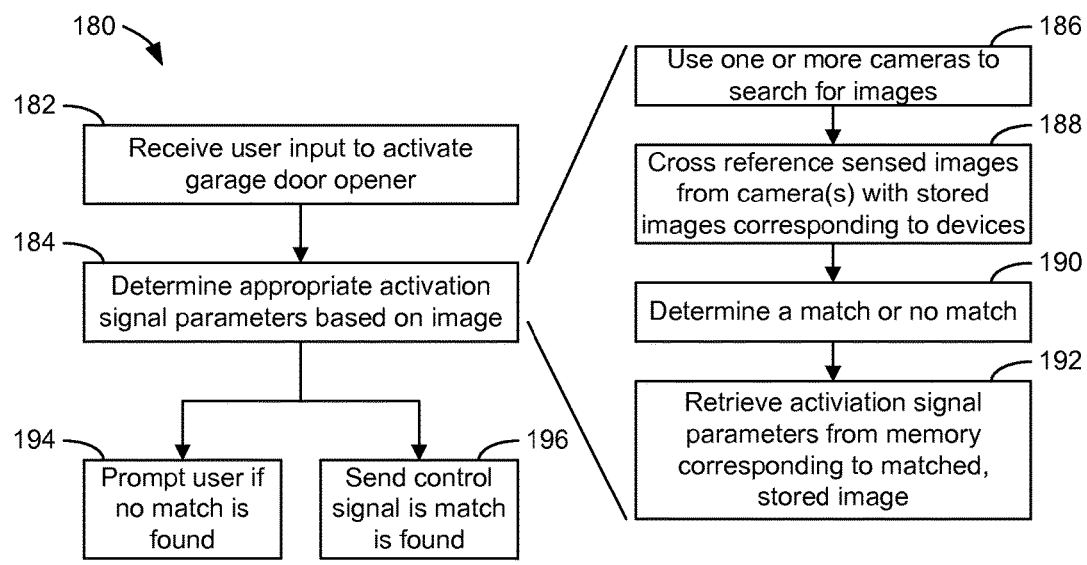
FIG. 6 illustrates a flow chart showing one embodiment of a method of sending an activation signal with a trainable transceiver based on an image received from a camera.

Referring now to FIG. 6, a flow chart illustrating an exemplary method 180 of controlling a device using the trainable transceiver is illustrated. The trainable transceiver may receive a user input to activate a garage door opener (step 182). For example, the user may press a single multiple channel button. In other embodiments, the user may provide a voice input using a microphone, hard key input, soft key input, or other input. In alternative embodiments, now user input is needed and the trainable transceiver will act automatically. The input may be activate any home electronic device, remote device, network device, mobile communications device, and/or other device or devices the trainable transceiver is trained to control. The input form the operator input device may be received and/or processed by the control circuit.

Upon receiving the user input, or automatically in some embodiments, the trainable transceiver may determine the appropriate activation signal parameters based on an image and/or image data (step 184). In one embodiment, the trainable transceiver determines the appropriate activation signal parameters by using one or more cameras to sense objects and/or images (step 186). The cameras may be controlled and/or images and/or image data received from the cameras using a camera interface and/or the control circuit. The images and/or image data from the camera(s) may then be cross referenced against stored images (e.g., comparison images) which correspond to devices the trainable transceiver has been trained to control (step 188). The control circuit may be used to cross reference the images, and the stored images may be stored in memory of the trainable transceiver. For example, the trainable transceiver may apply (e.g., using the control circuit) one or more image processing algorithms, object detection algorithms, and/or other algorithms or programs for comparing two images. The trainable transceiver may determine (e.g., using the control circuit) if a match has been found or if no match has been found (step 190). For example, the trainable transceiver may apply (e.g., using the control circuit) an algorithm or other program to determine if two images match with a probability greater than a minimum threshold. If a sensed image and a stored image are determined to match, the trainable transceiver may retrieve (e.g., using the control circuit) activation signal parameters and/or other communication information from memory which correspond to the stored image found to match the sensed image (step 192). The memory may be local to the trainable transceiver or remote from the trainable transceiver with the information retrieved using the control circuit and/or a transceiver.

In other embodiments, the trainable transceiver may compare sensed identification information to stored identification information rather than comparing a sensed image to stored images. The sensed identification information may be retrieved using a camera(s) and algorithms, software, and/or programs to read the machine readable image with the encoded identification information or decode the light source transmitting the identification information.

If no match is found between the sensed image and a stored image, the trainable transceiver may provide a prompt to the user (step 194). For example, the trainable transceiver may provide an audio prompt such as a noise or voice (e.g., "no garage door opener found"). In some embodiments, the trainable transceiver may provide a visual prompt such as illuminating an LED, displaying text based or graphic based image on a display screen, or otherwise visually prompting the user. In some embodiments, the user may provide a manual input from an additional input device such as an additional button or a different voice command. In response to the additional input, the trainable transceiver may access stored activation signal parameters corresponding to a particular device identified by the user through the additional input.

If a match is found between the sensed image and the stored image and the trainable transceiver retrieves activation signal parameters, the trainable transceiver may send an activation signal (step 196). Sending an activation signal may include formatting an activation signal using the control circuit of the trainable transceiver and/or transmitting the activation signal using the transceiver circuit.

Generally, the wireless activation signal and/or other wireless communication with a home electronic device, remote device, and/or other device described herein may alternatively be performed using a light source associated with the trainable transceiver and a camera associated with the device to be controlled. For example, the home electronic device may be coupled to a camera which is located such as to provide a line of sight to a vehicle having a trainable transceiver. The trainable transceiver may be configured to control a light emitting source. In some embodiments, the trainable transceiver includes a light emitting source such as an LED. In other embodiments, the trainable transceiver may control a light emitting source such as the headlights of the vehicle (e.g., through an interface with the vehicle electronic systems), a light source in the rear view mirror (e.g., through the rear view mirror interface), and/or another light source. By turning on and off the light source, the trainable transceiver may communicate information to the camera. The light received using the camera may be interpreted by the device to which the camera is coupled and used to control and/or otherwise communicate with the device. In some embodiments, the light used is visible light. In other embodiments, the light is not visible. For example, the light may be in the infrared spectrum, ultraviolet spectrum, or otherwise not visible. In further embodiments, the communication may be two way communication using the above described techniques and where the home electronic device, remote device, and/or other device includes a light source. Signals from the device may be received using a camera in communication with the trainable transceiver.

In one embodiment, a camera in communication with the trainable transceiver (e.g., a front facing camera in the rear view mirror) captures an image of a garage door corresponding to a garage door opener that the trainable transceiver has been trained to control. The trainable transceiver may determine that the image from the vehicle camera matches a comparison image stored in memory. Alternatively, the trainable transceiver may identify the garage door opener using one or more of the techniques described herein. The trainable transceiver may then format a activation signal based on information stored in memory (e.g., frequency, encryption, identification, and/or other activation signal information corresponding to a comparison image). The formatted activation signal may then be transmitted to a camera coupled to the garage door opener (e.g., mounted on an exterior wall of the garage and in wired or wireless communication with the garage door opener). The camera may receive the activation signal as sequence of light from the headlights of other light source of the vehicle controlled by the trainable transceiver. Information may be transmitted to the garage door opener using the light source based on the frequency with which the light source is turned on and off, the duration of the light source being on and/or off, the characteristics of the light emitted (e.g., wavelength), and/or other techniques used to transmit information using light. The frequency of the light may be outside the visible spectrum and be a frequency which is detected by the CCD and/or CMOS sensors used in one or cameras.

Security Functions and Additional Embodiments

The system described herein may be used for security functions in some embodiments. When a device is activated by a trainable transceiver, an image or series of images (e.g., video) may be recorded. The image or series of images may be stored in a remote location such as server, in a cloud based infrastructure, locally, or in another location. In some embodiments, the images are taken using a camera associated with a vehicle or trainable transceiver. For example, the camera may be coupled to the trainable transceiver, mounted in or on a vehicle, be coupled to a rear view mirror, and/or otherwise be associated with a vehicle and/or trainable transceiver. The trainable transceiver may transmit the images to a remote location using a transceiver such as a cellular transceiver. The transceiver may be part of the trainable transceiver or accessible to the trainable transceiver as described herein (e.g., as part of a vehicle electronics system, included in a rear view mirror, included in a mobile communications device in communication with the trainable transceiver, or otherwise be available to the trainable transceiver).

In other embodiments, the images are taken using a camera or cameras associated with the device which received the activation signal. For example, a home electronics device such as a garage door opener may include or be coupled to a camera. When the garage door opener is activated it may take an image or images using the camera. The images may be stored locally and/or transmitted to a remote location. For example, the device may transmit the images using an internet connection, cellular transceiver, Bluetooth transceiver, and/or other device. In some embodiments, the images are transmitted using an intermediary device. For example, the device may transmit the images to a trainable transceiver which may receive the images using the transceiver circuit. The trainable transceiver may then store and/or retransmit the images.

In one embodiment, the camera(s) associated with the vehicle or trainable transceiver and/or the camera(s) associated with a device are configured to record images continuously. The recoded images and/or other information may be stored locally and/or remotely. The images and/or image information may be stored for a limited amount of time and/or written over in memory. For example, images and/or other data may be stored in one minute increments with the previous one minute increment overwritten in memory by the current one minute increment. In other embodiments, the images and/or other information are rewritten continuously such that images and/or other information are stored for only the time increment. For example, only the last one minute of images and/or other information is available at any instant. In other embodiments, the other information may be stored without being overwritten.

In some embodiments, when an activation signal is sent by a trainable transceiver and/or received by a device, the images and/or other information for the preceding time increment are stored in a location which is not overwritten. A triggering event causes the images and/or other information to be stored such that the images and/or other information is not overwritten during the continuous storage of images and/or other information described above. Images and/or other information may be recoded in memory that is not overwritten during the above described processes corresponding to a set time increment (e.g., one minute) after the activation signal is sent and/or received. Advantageously, this allows images and/or other information to be stored for a time before the activation signal is sent or received such that a user may view what occurred prior to the activation signal. Additionally, a user may view the stored images and/or other information following the activation signal.

In some embodiments, the images are stored and/or transmitted along with other information such as the time and date, information identifying the source of the activation signal (e.g., which of a plurality of trainable transceivers trained to control the device sent the activation signal), information identifying the device, the location of the device, and/or other information describing the trainable transceiver, the activation signal, and/or the device.

This may allow a user to view past activity with respect to one or more devices and/or one or more trainable transceivers. In some embodiments, the user may access the images and/or other information through a web browser, have the images and/or information e-mailed to the user, access the images and/or other information using a trainable transceiver, or otherwise access the information.

In some embodiments, a trainable transceiver may provide an alert if one of the devices it is trained to control receives an activation signal from another source. The device may notify the trainable transceiver. For example, the device may transmit the images and/or other information to the trainable transceiver using a wireless signal and/or intermediate devices. A trainable transceiver may notify other trainable transceivers trained to control the same device. For example, the trainable transceiver may transmit the images and/or other information to other trainable transceivers using a wireless signal and/or intermediate devices. In some embodiments, the trainable transceiver may be notified by a push notification from a server or other source storing the images and/or other information. In still further embodiments, the trainable transceiver may request information from and/or query the server or other source at fixed intervals (e.g., every 15 minutes) or upon the occurrence of an event (e.g., the trainable transceiver enters a geographic boundary for a device it is trained to control). This may be a pull notification.

Upon determining that the device has been activated by another trainable transceiver or other source using the techniques described herein, the trainable transceiver may produce the alert. In some embodiments, the alert is an audio and/or visual alter. For example, the alert may be a noise or voice (e.g., "the garage door has been opened at five fifteen P.M.") played using a speaker coupled to the trainable transceiver. The alert may include a visual component such as illuminating an LED, providing a text based message on a display screen coupled to the trainable transceiver, providing a graphic or images on a display screen coupled to the trainable transceiver, etc. In some embodiments, the trainable transceiver may display an images, images, and/or other information (e.g., time, date, location, etc.), taken as described above, as part of the alert. Advantageously, this may allow a user to see who has activated the device.

The trainable transceiver and one or more cameras may be used to visually confirm that a home electronic device, remote, device, network device, mobile communications device, and/or other device has received an activation signal. For example, a camera may provide a visual image of a closed garage door to a vehicle occupant after the vehicle has left visual range of the garage door. A camera coupled to the garage door or otherwise located in view of the garage door (e.g., as part of a gate system, on a mailbox, in a yard, on a light post, and/or in another location which has a line of sight to the garage door) may be used to provide an image confirming that the garage door was closed upon the garage door opener receiving an activation single from the trainable transceiver.

The camera(s) may send images, image data, and/or other information (e.g., time, date, location, etc.) to the trainable transceiver directly or through an intermediate device. For example, a camera coupled to the garage door opener may send images, image data, and/or other information through a transceiver included in the garage door opener. The trainable transceiver may receive the images using the transceiver circuit and/or an additional transceiver. Alternatively, the trainable transceiver may receive images from the camera(s) using one or more intermediate devices. For example, the trainable transceiver may be in communication with or otherwise have access to a cellular transceiver such as a cellular transceiver located in a mobile communications device in communication with the trainable transceiver or vehicle electronics system in communication with the trainable transceiver. The camera(s) and/or a device with which the cameras communicate may include a cellular transceiver and/or other transceiver.

In some embodiments, the camera(s) and/or devices to which they are coupled transmit or otherwise make available images, image data, and/or other information through the internet. For example, the camera(s) may be IP cameras and/or the device(s) with which the camera(s) communicate may have access to the internet (e.g., through a wireless connection to a router, wired connection to a router, modem, and/or using other networking hardware.).

In some embodiments, an additional sensors or sensors may be used in providing visual confirmation that the device has been activated. For example, a garage door opener may include a sensor which detects that the garage door has closed. This may be a pressure sensor for sensing that the garage door is in contact with the ground, a beam (e.g., infrared) that is broken when the garage door is closed, and/or other sensor configured to sense whether the garage door is closed. Information from the sensor may be sent to the trainable transceiver. For example, one or more of the above described techniques may be used.

In some embodiments, images, image data, sensor data, and/or other information is transmitted to the trainable transceiver upon a device receiving an activation signal. The images, image data, sensor data, and/or other information may be transmitted for a set period of time. For example, the transmission may continue for as long as the garage door opener is on (e.g., closing the garage door), the time it takes to close a garage door (e.g., 45 seconds), and/or another fixed time. In other embodiments, the images, image data, sensor data, and/or other information may be transmitted once the device has detected that the result of the activation signal has been completed. For example, the garage door opener may detect (e.g., using a sensor) that the garage door is closed in response to an activation signal and then send an image of the closed garage door to the trainable transceiver.

In other embodiments, the trainable transceiver may request images, image data, sensor data, and/or other information from a device and/or camera following the transmission of an activation signal. The request may be sent automatically following the transmission of the activation signal. For example, the trainable transceiver may send a request after a set time period (e.g., 45 seconds) has elapsed from sending the activation signal. The request may include the time for which images, image data, sensor data, and/or other information is to be transmitted to the trainable transceiver. For example, the request may cause the device and/or camera to provide images to the trainable transceiver for 15 seconds following receipt of the request. Alternatively, the request may be sent in response to a user input received by an operator input device and/or the control circuit of the trainable transceiver. Advantageously, this may allow a user to visually check the status of one or more devices when the user wants to know the status of the device.

In one embodiment, images, image data, sensor data, and/or other information are displayed to a user using a display in communication with the trainable transceiver. For example, the display may be included in the trainable transceiver, part of a vehicle electronics system controllable by the trainable transceiver, part of an infotainment system controllable by the trainable transceiver, included in a rear view mirror and controllable by the trainable transceiver, included in a mobile communications device in communication with the trainable transceiver, and/or otherwise be controllable by the trainable transceiver. In some embodiments, image data, sensor data, and/or other information may be communicated to a vehicle occupant using a speaker.

In one embodiment, the above described systems and techniques allow a user to visually confirm that a garage door is closed in response to an activation signal sent be the user to the garage door opener. A user may pull out of the garage and send an activation signal to a garage door opener using the trainable transceiver. The activation signal may result in the garage door opener closing the garage door. The user may then receive visual confirmation of the garage door being closed as an image or images of the closed garage door displayed on a display in the vehicle. Advantageously, this may allow a vehicle occupant to visually confirm that the garage door has been closed without having a line of site to the garage door. A driver need not wait within visual range of the garage door while the door closes to have visual confirmation that the garage door is closed rather than still open (e.g., as a result of failure to receive an activation signal, an object preventing the garage door from closing, an object triggering a feature of the garage door to stop and/or open the garage door (e.g., a broken safety beam), another activation signal, or other cause).

Conditional Automatic Transmission of Activation Signals and Additional Embodiments In some embodiments, a trainable transceiver 20 may be configured to conditionally send an activation signal upon determining that a certain condition is met. In some embodiments, the condition may be set or customized by a user through a user interface in communication with the trainable transceiver 20. For example, a user may customize the trainable transceiver 20 using an operator input device of a trainable transceiver 20, mobile communications device, cloud client, and/or other user interface. In one embodiment, the trainable transceiver 20 is configured to control a lighting system (e.g., a home lighting system, exterior lighting system, garage lighting system, etc.) based on a received user input and the occurrence of a condition. For example, when a user presses a button on the trainable transceiver 20 corresponding to turning on a lighting system, the trainable transceiver 20 may determine if a condition is met prior to sending the activation signal formatted to turn on the lighting system. The condition may be that it is dark outside (e.g., nighttime). In one embodiment, the trainable transceiver 20 determines if it is dark outside using information form a light sensor. The light sensor may be included in the trainable transceiver 20, included in a rear view mirror in communication with the trainable transceiver 20, included in a vehicle electronics system, and/or otherwise in communication with the trainable transceiver 20. For example, the trainable transceiver 20 may determine if the intensity of the light measured by the light sensor is below a threshold value. If it is below the threshold value, the trainable transceiver 20 may transmit the activation signal to turn on the lighting system. If the measured light is not below the threshold value, the trainable transceiver 20 may not send an activation signal to turn on the lighting system. In other embodiments, different conditions are used. For example, the condition may be certain time (e.g., after 5 pm) where the trainable transceiver 20 only transmits the activation signal to turn on the lights if the current time is greater than the threshold time or condition time (e.g., after 5 pm). Alternatively, a time range may be used wherein the activation signal is sent if the current time is within the range (e.g., 4 pm to 5 am) or in alternative embodiments outside the range (e.g., 9 am to 5 pm).

In some embodiments, the trainable transceiver 20 may be configured to send a plurality of activation signals (e.g., formatted such that each activation signal controls a different device of a plurality of devices). One or more of the activation signals may be conditional. For example, when a single button of a trainable transceiver 20 is pressed, the trainable transceiver 20 may send a first activation signal and a conditional activation signal. The first activation signal may always be sent in response to the input. The conditional activation signal may be sent in response to the input only if the condition is also satisfied. For example, a trainable transceiver 20 may be configured to send a first activation signal to a garage door opener and a conditional activation signal to a lighting system. The conditional activation signal may be configured such that the activation signal to the lighting system is only sent if the trainable transceiver 20 determines it is dark outside (e.g., using one or more techniques described above). If the trainable transceiver 20 receives an input through the button, the trainable transceiver 20 will send an activation signal to the garage door opener, the trainable transceiver 20 will determine if it is dark outside, and the trainable transceiver 20 will send an activation signal to the lighting system if it determines that is dark outside. If the trainable transceiver 20 does not determine that is dark outside, the trainable transceiver 20 will not send the activation signal to the lighting system (but will still send the activation signal to the garage door opener). Therefore, a single button of the trainable transceiver 20 may be used to control two or more devices and/or conditionally control one of the devices.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for installation in a vehicle and for controlling a remote device, comprising:
   a trainable transceiver;
   a user interface element for activating the remote device;
   a camera; and
   a control circuit coupled to the trainable transceiver and the camera, the control circuit configured to:
      use, responsive to receipt of an input on the user interface element, the camera to extract information from a machine readable image associated with the remote device;
      identify the remote device by comparing the extracted information to information stored in memory;
      determine which of a plurality of activation signals to transmit from the trainable transceiver based on the identification of the remote device;
      automatically transmit an activation signal formatted to control the remote device, using the trainable transceiver, in response to the determination of which of the plurality of activation signals to transmit based on the identification of the remote device; and
      stop comparing the extracted information to information stored in memory when the trainable transceiver is outside a geographic boundary, after a predetermined period of time, or after a predetermined number of failed comparisons of the extracted information to information stored in memory.

2. The system of claim 1, wherein the control circuit stores activation signal parameters corresponding with one or more remote devices with information stored is memory for use in identifying the one or more remote devices.

3. The system of claim 1, wherein the machine readable image associated with the remote device is located on a garage door.

4. The system of claim 1, wherein the machine readable image associated with the remote device is located on a structure of a garage.

5. The system of claim 1, wherein the machine readable image is at least one of a quick reference code and bar code.

6. A system for installation in a vehicle and for controlling a remote device, comprising:
   a trainable transceiver;
   a user interface element for activating the remote device;
   a camera interface configured to receive images through a wired or wireless connection with one or more cameras located in or on the vehicle; and
   a control circuit coupled to the trainable transceiver and the camera interface, the control circuit configured to:
      use, responsive to receipt of an input on the user interface element, the camera interface to extract information from a machine readable image associated with the remote device;
      identify the remote device by comparing the extracted information to information stored in memory;
      determine which of a plurality of activation signals to transmit from the trainable transceiver based on the identification of the remote device;

automatically transmit an activation signal formatted to control the remote device in response to the determination of which of the plurality of activation signals to transmit based on the identification of the remote device; and stop comparing the extracted information to information stored in memory when the trainable transceiver is outside a geographic boundary, after a predetermined period of time, or after a predetermined number of failed comparisons of the extracted information to information stored in memory.

7. The system of claim 6, wherein the control circuit stores activation signal parameters corresponding with one or more remote devices with information stored in memory for use in identifying the one or more remote devices.

8. The system of claim 6, wherein the machine readable image associated with the remote device is located on a garage door or on a structure of a garage.

9. The system of claim 6, wherein the machine readable image is at least one of a quick reference code and bar code.

10. A system for installation in a vehicle and for controlling a remote device, comprising:
a user interface element for activating the remote device;
a camera;
a trainable transceiver; and
a control circuit coupled to the camera and the trainable transceiver, the control circuit configured to use information received at the camera to determine which of at least two possible command signals to transmit from the trainable transceiver, wherein upon receiving an input at the user interface element, the control circuit is configured to transmit a single command signal based on the determination;

wherein two different garage doors are trained to the user interface element and information from the camera is used to determine which garage door the vehicle is approaching and determine which of the at least two possible command signals to transmit from the trainable transceiver.

11. The system of claim 10, wherein global positioning information is not used to determine which of the at least two possible command signals to transmit from the trainable transceiver.

12. The system of claim 10, wherein global positioning information is used to determine which of a set of garage doors the vehicle is approaching, and wherein the single command signal is transmitted automatically when the control circuit identifies the remote device by comparing information received via the camera to information stored in memory.

13. The system of claim 1, wherein the machine readable image is not visible to a human eye and is visible to the camera.

14. The system of claim 1, wherein the control circuit is further configured to, in response to identifying the remote device, automatically transmit a second activation signal formatted to control a second remote device.

15. The system of claim 6, wherein the machine readable image is not visible to a human eye and is visible to the camera.

16. The system of claim 6, wherein the control circuit is further configured to, in response to identifying the remote device, automatically transmit a second activation signal formatted to control a second remote device.

* * * * *